US011970381B2

(12) United States Patent
Ross et al.

(10) Patent No.: US 11,970,381 B2
(45) Date of Patent: Apr. 30, 2024

(54) METHODS OF CAPPING METALLIC BOTTLES

(71) Applicant: BALL CORPORATION, Westminster, CO (US)

(72) Inventors: John R. Ross, Broomfield, CO (US); David J. Bonfoey, Broomfield, CO (US)

(73) Assignee: BALL CORPORATION, Westminster, CO (US)

( * ) Notice: Subject to any disclaimer, the term of this patent is extended or adjusted under 35 U.S.C. 154(b) by 0 days.

(21) Appl. No.: 17/853,065

(22) Filed: Jun. 29, 2022

(65) Prior Publication Data

US 2022/0324689 A1 Oct. 13, 2022

Related U.S. Application Data

(62) Division of application No. 16/688,873, filed on Nov. 19, 2019, now Pat. No. 11,459,223, which is a (Continued)

(51) Int. Cl.

*B67B 3/20* (2006.01)
*B65D 1/02* (2006.01)
*B67B 3/18* (2006.01)

(52) U.S. Cl.

CPC .......... *B67B 3/2066* (2013.01); *B65D 1/0246* (2013.01); *B67B 3/18* (2013.01)

(58) Field of Classification Search

CPC ....... B67B 3/18; B67B 3/2066; B67B 3/2026; B67B 3/10; B67B 3/12; B67B 3/206; B65D 1/0246

(Continued)

(56) References Cited

U.S. PATENT DOCUMENTS 2,018,022 A 3/1933 Johnson
2,038,524 A 4/1936 Carvalho (Continued)

FOREIGN PATENT DOCUMENTS

CA 707608 4/1965
CA 720701 11/1965

(Continued)

OTHER PUBLICATIONS

"Ball Packaging Europe at drinktec 2013," Packaging Europe News Oct. 7, 2013, 2 pages [retrieved from: http://www.packagingeurope.com/Packaging-Europe-News/54154/Ball-Packaging-Europe-at-drinktec-2013.html].

(Continued)

*Primary Examiner* — Dariush Seif

(74) *Attorney, Agent, or Firm* — Sheridan Ross P.C.

(57) ABSTRACT

Methods of sealing a metallic container are provided. More specifically, the present invention relates to methods that reduce the amount of force applied to a metallic bottle to seal the metallic bottle with a ROPP closure. The methods include use of a capping apparatus that may include more thread rollers than known capping apparatus. Optionally, the thread rollers may use more forming passes to form threads on the ROPP closure. The capping apparatus may also rotate one or more of the ROPP closure and the metallic container in a closing direction before the metallic container is discharged. In one embodiment, the thread rollers form the closure threads before or after a pilfer roller applies a sideload to the ROPP closure.

19 Claims, 11 Drawing Sheets

Related U.S. Application Data division of application No. 15/236,174, filed on Aug. 12, 2016, now abandoned.

(58) Field of Classification Search
USPC .......................................................... 53/488
See application file for complete search history.

(56) References Cited

U.S. PATENT DOCUMENTS 2,091,295 A 8/1937 Williams
2,094,031 A 9/1937 Williams
2,116,199 A 5/1938 Held
2,119,662 A 6/1938 Williams
2,154,409 A 4/1939 Abraham
2,207,564 A 7/1940 Wackman
2,215,845 A 9/1940 Williams et al.
2,348,464 A 5/1944 Kenneth
2,349,037 A 5/1944 Gibbs
2,585,047 A 3/1948 Frank
2,442,965 A 6/1948 Thomas
3,029,507 A 4/1962 Gaggini
3,144,964 A 8/1964 Goff et al.
3,147,721 A 9/1964 Holmes
3,164,287 A 1/1965 Williamson
3,227,318 A 1/1966 Rieder
3,232,260 A 2/1966 Siemonsen
3,537,291 A 11/1970 Hawkins
3,578,223 A 5/1971 Armour
3,603,472 A 9/1971 Lecinski, Jr. et al.
3,645,062 A * 2/1972 Hannon .................... B67B 3/18 53/488
3,812,646 A 5/1974 Baldyga et al.
3,818,677 A * 6/1974 Herbert ..................... B67B 3/18 53/338
3,824,941 A 7/1974 Hannon
3,866,463 A * 2/1975 Smith ..................... B67B 3/261 73/806
3,878,667 A * 4/1975 Holstein ................... B67B 3/18 53/340
4,031,836 A 6/1977 Grise et al.
4,054,229 A 10/1977 Arfert
4,185,576 A * 1/1980 George ................ B65D 41/348 413/67
4,199,073 A 4/1980 Gombas
4,232,500 A * 11/1980 Holstein ................... B67B 3/18 53/334
4,243,438 A 1/1981 Yanagida et al.
4,260,419 A 4/1981 Robertson
4,282,044 A 8/1981 Robertson et al.
4,318,755 A 3/1982 Jeffrey et al.
4,392,580 A * 7/1983 Ochs .................. B65D 41/0442 215/332
4,403,493 A 9/1983 Atkinson
4,411,707 A 10/1983 Brennecke et al.
4,420,959 A * 12/1983 King ...................... B21D 51/50 413/46
4,466,548 A 8/1984 Herbert
4,561,280 A 12/1985 Bachmann et al.
4,628,669 A * 12/1986 Herron ................. B65D 41/348 53/425
4,693,108 A 9/1987 Traczyk et al.
4,732,027 A 3/1988 Traczyk et al.
4,823,537 A * 4/1989 Duke ........................ B67B 3/18 413/8
4,895,012 A 1/1990 Cook et al.
5,078,290 A 1/1992 Ochs
5,102,705 A 4/1992 Yammoto et al.
5,104,465 A 4/1992 McAuliffe et al.
5,110,545 A 5/1992 McAuliffe et al.
5,138,858 A 8/1992 Johnson et al.
5,174,145 A 12/1992 Tsuzuki
5,207,341 A 5/1993 Yeager
5,255,805 A 10/1993 Weiss et al.
5,293,765 A 3/1994 Nussbaum-Pogacnik
5,355,710 A 10/1994 Diekhoff
5,362,341 A 11/1994 Palmer et al.
5,394,727 A 3/1995 Diekhoff et al.
5,445,284 A 8/1995 Guest
5,448,903 A 9/1995 Johnson
5,469,729 A 11/1995 Hager
5,486,243 A 1/1996 Hashiguchi et al.
5,487,295 A 1/1996 Diekhoff et al.
5,503,690 A 4/1996 Wade et al.
5,522,248 A 6/1996 Diekhoff et al.
5,522,950 A 6/1996 Bartges et al.
5,551,997 A 9/1996 Marder et al.
5,571,347 A 11/1996 Bergsma
5,572,893 A 11/1996 Goda et al.
5,704,240 A 1/1998 Jordan
5,713,235 A 2/1998 Diekhoff
5,718,352 A 2/1998 Diekhoff et al.
5,769,331 A 6/1998 Yamagishi et al.
5,772,802 A 6/1998 Sun et al.
5,778,723 A 7/1998 Silverman et al.
5,806,707 A 9/1998 Boehm et al.
5,822,843 A 10/1998 Diekhoff et al.
6,010,026 A 1/2000 Diekhoff et al.
6,010,028 A 1/2000 Jordan et al.
6,100,028 A 8/2000 Cole et al.
6,126,034 A 10/2000 Borden et al.
6,171,362 B1 1/2001 Osumi et al.
6,301,766 B1 10/2001 Kollé
6,341,706 B1 1/2002 Neuner
6,355,090 B1 3/2002 Ohyama et al.
6,368,427 B1 4/2002 Sigworth
6,375,020 B1 4/2002 Marquez
6,543,636 B1 4/2003 Flecheux et al.
6,588,614 B2 7/2003 Neuner
6,607,615 B1 8/2003 Bekki et al.
6,626,310 B2 9/2003 Taha
6,627,012 B1 9/2003 Tack et al.
6,630,037 B1 10/2003 Sawada et al.
6,666,933 B2 12/2003 Roberts et al.
6,676,775 B2 1/2004 Barth et al.
6,713,235 B1 3/2004 Ide et al.
6,766,677 B1 7/2004 Turnbull
6,779,677 B2 8/2004 Chupak
6,907,653 B2 6/2005 Chupak
6,945,085 B1 9/2005 Goda
6,959,830 B1 11/2005 Kanou et al.
7,014,060 B2 * 3/2006 Richardson .......... B65D 51/145 220/288
7,117,704 B2 10/2006 Ogura et al.
7,140,223 B2 11/2006 Chupak
7,147,123 B2 12/2006 Yamashita
7,171,840 B2 2/2007 Kanou et al.
7,294,213 B2 11/2007 Warner et al.
7,503,741 B2 3/2009 Gillest
7,520,044 B2 4/2009 Bulliard et al.
7,555,927 B2 7/2009 Hanafusa et al.
7,588,808 B2 9/2009 Hutchinson et al.
7,666,267 B2 2/2010 Benedictus et al.
7,713,363 B2 5/2010 Sano et al.
7,798,357 B2 9/2010 Hanafusa et al.
7,824,750 B2 11/2010 Takegoshi et al.
7,905,130 B2 3/2011 Marshall et al.
7,942,028 B2 5/2011 Gillest et al.
7,946,436 B2 5/2011 Laveault et al.
8,016,148 B2 9/2011 Walsh
8,037,728 B2 10/2011 Hosoi
8,037,734 B2 10/2011 Hanafusa et al.
8,091,402 B2 1/2012 Hanafusa et al.
8,132,439 B2 3/2012 Hanafusa et al.
8,132,687 B2 3/2012 Fedusa et al.
8,313,003 B2 11/2012 Riley et al.
8,349,419 B2 1/2013 Nishida et al.
8,360,266 B2 1/2013 Adams et al.
8,474,634 B1 7/2013 Branson et al.
8,496,131 B2 7/2013 Forrest et al.
8,505,350 B2 8/2013 Marshall et al.
8,631,632 B2 * 1/2014 Morales ................ B65D 83/62 222/402.1
8,740,001 B2 6/2014 Hanafusa et al.

(56) References Cited

U.S. PATENT DOCUMENTS

| | | | | |
|---|---|---|---|---|
| 9,227,748 | B2 | 1/2016 | Nakagawa et al. | |
| 9,327,899 | B2 | 5/2016 | Greenfield et al. | |
| 9,409,433 | B2 | 8/2016 | Carreras | |
| 9,517,498 | B2* | 12/2016 | Siles | B21C 23/002 |
| 9,663,846 | B2* | 5/2017 | Siles | B22D 21/007 |
| 9,821,926 | B2 | 11/2017 | Robinson et al. | |
| 9,844,805 | B2* | 12/2017 | Siles | B23P 15/00 |
| 10,875,684 | B2 | 12/2020 | Ross et al. | |
| 11,185,909 | B2 | 11/2021 | Ross et al. | |
| 11,459,223 | B2 | 10/2022 | Ross | |
| 2001/0003292 | A1 | 6/2001 | Sun et al. | |
| 2001/0031376 | A1 | 10/2001 | Fulton et al. | |
| 2002/0134747 | A1 | 9/2002 | Babcock et al. | |
| 2003/0102278 | A1 | 6/2003 | Chupak | |
| 2003/0132188 | A1 | 7/2003 | Beek et al. | |
| 2004/0025981 | A1 | 2/2004 | Tack et al. | |
| 2004/0035871 | A1 | 2/2004 | Chupak | |
| 2004/0140237 | A1 | 7/2004 | Brownewell | |
| 2004/0173560 | A1 | 9/2004 | Chupak | |
| 2004/0213695 | A1 | 10/2004 | Ferreira et al. | |
| 2005/0029219 | A1 | 2/2005 | Taber et al. | |
| 2005/0067365 | A1* | 3/2005 | Hanafusa | B65D 1/0246 215/43 |
| 2005/0115294 | A1 | 6/2005 | Kanou et al. | |
| 2005/0127077 | A1 | 6/2005 | Chupak | |
| 2005/0150193 | A1* | 7/2005 | Bernhard | B67B 3/2033 53/317 |
| 2005/0205575 | A1* | 9/2005 | Kobayashi | B21D 51/46 215/44 |
| 2006/0169665 | A1 | 8/2006 | Matukawa et al. | |
| 2007/0034593 | A1 | 2/2007 | Ichimura et al. | |
| 2007/0051687 | A1 | 3/2007 | Olson | |
| 2007/0062952 | A1 | 3/2007 | Kobayashi et al. | |
| 2007/0080128 | A1 | 4/2007 | Laveault et al. | |
| 2007/0175855 | A1 | 8/2007 | Penny | |
| 2007/0295051 | A1 | 12/2007 | Myers et al. | |
| 2008/0022746 | A1 | 1/2008 | Myers et al. | |
| 2008/0041501 | A1 | 2/2008 | Platek et al. | |
| 2008/0047922 | A1 | 2/2008 | Olson et al. | |
| 2008/0073309 | A1 | 3/2008 | Nakajima et al. | |
| 2008/0163663 | A1 | 7/2008 | Hankey et al. | |
| 2008/0181812 | A1 | 7/2008 | Ferreira et al. | |
| 2008/0299001 | A1 | 12/2008 | Langlais et al. | |
| 2009/0178995 | A1 | 7/2009 | Tung et al. | |
| 2009/0220714 | A1 | 9/2009 | Nishida et al. | |
| 2009/0277862 | A1 | 11/2009 | Masuda et al. | |
| 2010/0065528 | A1 | 3/2010 | Hanafusa et al. | |
| 2010/0199741 | A1 | 8/2010 | Myers et al. | |
| 2011/0113732 | A1* | 5/2011 | Adams | B65B 7/2842 53/452 |
| 2011/0114649 | A1* | 5/2011 | Adams | B65D 1/44 220/601 |
| 2012/0024813 | A1* | 2/2012 | Nakagawa | B65D 1/0207 215/40 |
| 2012/0031913 | A1 | 2/2012 | Moore et al. | |
| 2012/0269602 | A1 | 10/2012 | Hanafusa et al. | |
| 2013/0068352 | A1* | 3/2013 | Siles | C22F 1/04 148/552 |
| 2013/0199017 | A1 | 8/2013 | Kurosawa et al. | |
| 2013/0202477 | A1 | 8/2013 | Zajac et al. | |
| 2013/0313287 | A1* | 11/2013 | Walsh | B65D 41/3404 264/318 |
| 2014/0021157 | A1 | 1/2014 | Gren et al. | |
| 2014/0263150 | A1* | 9/2014 | Robinson | B65D 1/0246 215/44 |
| 2014/0298641 | A1* | 10/2014 | Siles | B65D 1/0207 29/527.5 |
| 2015/0013416 | A1* | 1/2015 | Hosoi | B21D 51/38 72/68 |
| 2015/0020364 | A1 | 1/2015 | Bonfoey | |
| 2015/0135508 | A1 | 5/2015 | Ichimura et al. | |
| 2015/0165509 | A1* | 6/2015 | Dunwoody | B21D 51/44 72/362 |
| 2015/0225107 | A1* | 8/2015 | Ross | B65D 39/08 413/4 |
| 2015/0343516 | A1 | 12/2015 | Schremmer et al. | |
| 2015/0344166 | A1 | 12/2015 | Davis et al. | |
| 2015/0375888 | A1 | 12/2015 | Hosoi | |
| 2016/0052678 | A1 | 2/2016 | Hanafusa et al. | |
| 2016/0340088 | A1 | 11/2016 | Olson et al. | |
| 2017/0036255 | A1* | 2/2017 | Siles | B21C 23/002 |
| 2017/0267415 | A1 | 9/2017 | Olson et al. | |
| 2017/0320637 | A1* | 11/2017 | Jones | B65D 41/349 |
| 2018/0044155 | A1* | 2/2018 | Ross | B65D 1/0246 |
| 2018/0078982 | A1* | 3/2018 | Siles | B65D 41/045 |
| 2018/0229900 | A1* | 8/2018 | Ross | B65D 1/0246 |
| 2019/0084728 | A1* | 3/2019 | Bonfoey | B65D 41/3438 |
| 2022/0080490 | A1 | 3/2022 | Ross et al. | |
| 2022/0324689 | A1* | 10/2022 | Ross | B67B 3/18 |

FOREIGN PATENT DOCUMENTS

| | | |
|---|---|---|
| CA | 1252649 | 4/1989 |
| CA | 2133312 | 7/1994 |
| CA | 2169743 | 2/1995 |
| CA | 2206483 | 9/1999 |
| CA | 2302557 | 9/2001 |
| CA | 2469238 | 6/2003 |
| CA | 2655925 | 1/2008 |
| CA | 2662199 | 3/2008 |
| CA | 2665477 | 5/2008 |
| CA | 2638403 | 10/2009 |
| CN | 1044925 | 8/1990 |
| CN | 1256671 | 6/2000 |
| CN | 1994826 | 7/2007 |
| CN | 101294255 | 10/2008 |
| CN | 100515875 | 7/2009 |
| CN | 101888907 | 11/2010 |
| CN | 101985707 | 3/2011 |
| DE | 6903478 | 5/1969 |
| DE | 2314662 | 10/1973 |
| DE | 3927491 | 2/1991 |
| DE | 4315111 | 11/1994 |
| DE | 60206036 | 6/2006 |
| DE | 102005010786 | 2/2007 |
| EP | 0721384 | 7/1996 |
| EP | 0740971 | 11/1996 |
| EP | 1136154 | 9/2001 |
| EP | 1531952 | 8/2006 |
| EP | 1731239 | 12/2006 |
| EP | 2119515 | 11/2009 |
| EP | 2146907 | 1/2010 |
| EP | 2531409 | 12/2012 |
| EP | 2646328 | 10/2013 |
| EP | 2662295 | 11/2013 |
| EP | 2662296 | 11/2013 |
| EP | 2835188 | 2/2015 |
| EP | 2955131 | 12/2015 |
| FR | 1371041 | 8/1964 |
| FR | 2775206 | 8/1999 |
| GB | 449861 | 7/1936 |
| GB | 971258 | 9/1964 |
| GB | 1215648 | 12/1970 |
| GB | 1598428 | 9/1981 |
| GB | 2547016 | 8/2017 |
| HU | 229285 | 10/2013 |
| JP | S57-97644 | 6/1982 |
| JP | S58-030947 | 2/1983 |
| JP | S61-163233 | 7/1986 |
| JP | S62-263954 | 11/1987 |
| JP | H07-211494 | 8/1995 |
| JP | H09-057384 | 3/1997 |
| JP | H10-203573 | 8/1998 |
| JP | H11-293363 | 10/1999 |
| JP | 2000-063973 | 2/2000 |
| JP | 2001-115226 | 4/2001 |
| JP | 2001-172728 | 6/2001 |
| JP | 2001-181768 | 7/2001 |
| JP | 2001-213416 | 8/2001 |
| JP | 2001-315745 | 11/2001 |
| JP | 2002-137032 | 5/2002 |
| JP | 2002-173717 | 6/2002 |

(56) References Cited

FOREIGN PATENT DOCUMENTS

| | | |
|---|---|---|
| JP | 2002-192272 | 7/2002 |
| JP | 2002-237902 | 8/2002 |
| JP | 2002-302137 | 10/2002 |
| JP | 2003-094133 | 4/2003 |
| JP | 3408213 | 5/2003 |
| JP | 2003-192093 | 7/2003 |
| JP | 2003-205924 | 7/2003 |
| JP | 2003-268460 | 9/2003 |
| JP | 2003-320432 | 11/2003 |
| JP | 2004-035036 | 2/2004 |
| JP | 2004-083128 | 3/2004 |
| JP | 2004-203462 | 7/2004 |
| JP | 2004-210403 | 7/2004 |
| JP | 2004-262488 | 9/2004 |
| JP | 2005-096843 | 4/2005 |
| JP | 2005-511418 | 4/2005 |
| JP | 3665002 | 4/2005 |
| JP | 2005-132401 | 5/2005 |
| JP | 2005-186164 | 7/2005 |
| JP | 2005-193272 | 7/2005 |
| JP | 2005-263230 | 9/2005 |
| JP | 2005-280768 | 10/2005 |
| JP | 2006-001619 | 1/2006 |
| JP | 2003-54687 | 2/2006 |
| JP | 2006-062755 | 3/2006 |
| JP | 2006-062756 | 3/2006 |
| JP | 3754076 | 3/2006 |
| JP | 2006-095694 | 4/2006 |
| JP | 2006-321541 | 11/2006 |
| JP | 2007-015003 | 1/2007 |
| JP | 3886329 | 2/2007 |
| JP | 2007-061881 | 3/2007 |
| JP | 2007-106621 | 4/2007 |
| JP | 2007-153363 | 6/2007 |
| JP | 2008-068320 | 3/2008 |
| JP | 2008-087071 | 4/2008 |
| JP | 4115133 | 4/2008 |
| JP | 4159956 | 7/2008 |
| JP | 4173388 | 8/2008 |
| JP | 4245916 | 1/2009 |
| JP | 2009-40461 | 2/2009 |
| JP | 2009-108421 | 5/2009 |
| JP | 2010-018336 | 1/2010 |
| JP | 2010-202908 | 9/2010 |
| JP | 4553350 | 9/2010 |
| JP | 4564328 | 10/2010 |
| JP | 4646164 | 12/2010 |
| JP | 2011-037497 | 2/2011 |
| JP | 4723762 | 4/2011 |
| JP | 2011-116456 | 6/2011 |
| JP | 4757022 | 8/2011 |
| JP | 2011-208273 | 10/2011 |
| JP | 2011-526232 | 10/2011 |
| JP | 2012-192984 | 10/2012 |
| JP | 5290569 | 6/2013 |
| JP | 5323757 | 7/2013 |
| JP | 2013-244996 | 12/2013 |
| JP | 5597333 | 8/2014 |
| JP | 5855233 | 12/2015 |
| JP | 5857038 | 2/2016 |
| JP | 5887340 | 2/2016 |
| KP | 2003-334631 | 11/2003 |
| RU | 2095175 | 11/1997 |
| RU | 2221891 | 1/2004 |
| SU | 305941 | 6/1971 |
| SU | 804086 | 2/1981 |
| UA | 29644 | 2/2007 |
| UA | 44247 | 2/2007 |
| UA | 28415 | 12/2007 |
| WO | WO 92/04477 | 3/1992 |
| WO | WO 93/17864 | 9/1993 |
| WO | WO 94/20237 | 9/1994 |
| WO | WO 96/15865 | 5/1996 |
| WO | WO 96/28582 | 9/1996 |
| WO | WO 98/46488 | 10/1998 |
| WO | WO 99/32363 | 7/1999 |
| WO | WO 99/37826 | 7/1999 |
| WO | WO 01/32116 | 12/2001 |
| WO | WO 03/047991 | 6/2003 |
| WO | WO 03/057572 | 7/2003 |
| WO | WO 2004/018121 | 3/2004 |
| WO | WO 2004/094679 | 11/2004 |
| WO | WO 2007/030554 | 3/2007 |
| WO | WO 2008/089291 | 7/2008 |
| WO | WO 2009/091821 | 7/2009 |
| WO | WO 2009/115377 | 9/2009 |
| WO | WO 2010/117009 | 10/2010 |
| WO | WO 2011/059854 | 5/2011 |
| WO | WO 2011/078057 | 6/2011 |
| WO | WO 2011/147578 | 12/2011 |
| WO | WO 2012/133391 | 10/2012 |
| WO | WO 2012/144490 | 10/2012 |
| WO | WO 2013/167478 | 11/2013 |
| WO | WO 2013/167483 | 11/2013 |
| WO | WO 2014/168873 | 10/2014 |
| WO | WO 2015/054284 | 4/2015 |
| WO | WO 2017/134413 | 8/2017 |
| WO | WO 2017/191287 | 11/2017 |

OTHER PUBLICATIONS

"Electromagnetic forming," retrieved from http://en.wikipedia.org/wiki/Electromagnetic_forming, retrieved on Nov. 17, 2014, 4 pages.

"Impact Extrusion," Wikipedia, Dec. 9, 2009 retrieved from https://web.archive.org/web/20091209012819/http://en.wikipedia.org/wiki/Impact_extrusion, 5 pages.

"Screw thread," retrieved from http://en.wikipedia.org/wii/Screw_thread, retrieved on Jan. 8, 2015, 17 pages.

Cui et al. "Recycling of automotive aluminum," Transactions of Nonferrous Metals Society of China, Nov. 2010, vol. 20, No. 11, pp. 2057-2063.

Fisher et al. "Recycling—The Effect On Grain Refinement of Commercial Aluminum Alloys," London & Scandinavian Metallurgical Co Limited, 122nd TMS Annual Meeting & Exhibition, Feb. 21-25, 1993, 6 pages.

Goltz "Aluminum Bottles are Successful," University of Wisconsin, 2005, 5 pages [retrieved from: http://www2.uwstout.edu/content/rs/2005/article6.pdf].

Guley et al. "Direct recycling of 1050 aluminum alloy scrap material mixed with 6060 aluminum alloy chips by hot extrusion," International Journal of Material Forming, Apr. 2010, vol. 3, No. Suppl. 1, pp. 853-856.

Herbert, "Manufacturing Processes," Prentice-Hall, Inc., Englewood Cliffs, NJ, excerpts from pp. 548-553, 562-563, 1979, 11 pages.

Tekkaya et al. "Hot profile extrusion of AA-6060 aluminum chips," Journal of Materials Processing Technology, Apr. 2009, vol. 209, No. 7, pp. 3343-3350.

International Search Report and Written Opinion for International (PCT) Patent Application No. PCT/US2017/046026, dated Oct. 20, 2017 8 pages.

Official Action with English Translation for Brazil Patent Application No. BR112019002603-7, dated Sep. 28, 2021 5 pages.

Official Action for Canada Patent Application No. 3,032,935, dated Nov. 28, 2019 8 pages.

Official Action for U.S. Patent Application No. 3,032,935, dated May 7, 2020 10 pages.

Extended Search Report for European Patent Application No. 1740182.4, dated Mar. 12, 2020 10 pages.

Official Action for U.S. Appl. No. 15/236,174, dated Oct. 25, 2018 7 pages Restriction Requirement.

Official Action for U.S. Appl. No. 15/236,174, dated Feb. 27, 2019 9 pages.

Official Action for U.S. Appl. No. 15/236,174, dated Aug. 19, 2019 10 pages.

Advisory Action for U.S. Appl. No. 15/236,174, dated Nov. 29, 2019 7 pages.

Official Action for U.S. Appl. No. 16/688,873, dated Dec. 23, 2021 5 pages Restriction Requirement.

(56) References Cited

OTHER PUBLICATIONS

Official Action for U.S. Appl. No. 16/688,873, dated Mar. 17, 2022 7 pages.
Notice of Allowance for U.S. Appl. No. 16/688,873, dated Jun. 16, 2022 7 pages.
Official Action with English Translation for Brazil Patent Application No. BR112019002603-7, dated Aug. 2, 2022 5 pages.
Intention to Grant for European Patent Application No. 17840182.4, dated Feb. 11, 2022 5 pages.
Intention to Grant for European Patent Application No. 17840182.4, dated Jul. 6, 2022 5 pages.

* cited by examiner

METHODS OF CAPPING METALLIC BOTTLES

CROSS-REFERENCE TO RELATED APPLICATIONS

This application is a divisional application and claims the benefit and priority of U.S. patent application Ser. No. 16/688,873 filed Nov. 19, 2019, and entitled "Methods of Capping Metallic Bottles," which is a divisional application of U.S. patent application Ser. No. 15/236,174 filed Aug. 12, 2016, and entitled "Apparatus and Methods of Capping Metallic Bottles," which are each incorporated herein in their entirety by reference.

FIELD OF THE INVENTION

The present invention relates generally to the manufacture and sealing of containers. More specifically, this invention provides an apparatus and methods used to seal metallic containers with Roll-on Pilfer Proof (ROPP) closures.

BACKGROUND

Metallic containers offer distributors and consumers many benefits. The metallic body of a metallic container provides optimal protection properties for products. For example, the metallic body prevents $CO_2$ migration and transmission of UV radiation which may damage the contents of the metallic container and negatively influence the effectiveness of ingredients, as well as the flavor, appearance, or color of the product. Metallic containers also offer an impermeable barrier to light, water vapor, oils and fats, oxygen, and micro-organisms and keep the contents of the metallic container fresh and protected from external influences, thereby guaranteeing a long shelf-life.

The increased durability of metallic containers compared to glass containers reduces the number of containers damaged during processing and shipping, resulting in further savings. Additionally, metallic containers are lighter than glass containers of comparable size, resulting in energy savings during shipment. Further, metallic containers can be manufactured with high burst pressures which make them ideal and safe for use as containers holding products under pressure, such as carbonated beverage containers.

Additionally, many consumers prefer metallic containers compared to glass or plastic containers. Metallic containers are particularly attractive to consumers because of the convenience they offer. The light weight of metallic containers makes them easier to carry than glass containers. Metallic containers are particularly suitable for use in public places and outdoors because they are more durable than glass containers. Further, some consumers avoid plastic containers due to concerns that the plastic may leach chemicals into consumable products.

The exterior surfaces of metallic containers are also ideal for decorating with brand names, logos, designs, product information, and/or other preferred indicia for identifying, marketing, and distinguishing the metallic container and its contents from other products and competitors. Thus, metallic containers offer bottlers, distributors, and retailers an ability to stand out at the point of sale.

As a result of these benefits, sales of metallic containers were valued at approximately $53 billion globally in 2014. A large percentage of the metallic container market is driven by metallic beverage containers. According to one report, approximately 290 billion metallic beverage containers were shipped globally in 2012. One U.S. trade group reported that 126 billion metallic containers were shipped in the U.S. alone in 2014. To meet this demand, metallic container manufacturing facilities operate some of the fastest, if not the fastest, production lines in the container industry. Because of the high speeds of the production lines, techniques or processes that may work in other industries or with containers formed of other materials do not necessarily work at the high speeds required for metallic container production lines. Accordingly, specialized equipment and techniques are often required for many of the operations used to form and seal metallic containers.

Metallic beverage containers come in a variety of shapes and sizes. Some metallic beverage containers have a bottle shape. Metallic bottles typically include a closed bottom portion, a generally cylindrical body portion, a neck portion with a reduced diameter extending upwardly from the body portion, and an opening positioned on an uppermost portion of the neck portion. After being filled with a beverage or other product, metallic bottles are typically sealed with a roll-on-pilfer proof closure (ROPP), although other closures, such as twist-off crown caps and roll-on closures without a pilfer proof feature, may be used. Methods and apparatus of forming a threaded neck on a metallic bottle to receive a ROPP closure are described in U.S. Patent Application Publication No. 2014/0263150 and U.S. Patent Application Publication No. 2014/0298641, which are each incorporated herein by reference in their entirety.

Referring now to FIGS. 1A-1D, several actions must occur to generate and maintain an effective seal between a metallic bottle 2 and a ROPP closure 10. As shown in FIGS. 1A-1B, a ROPP shell 9 with an unthreaded body portion 12A is placed on the neck portion 4 of the metallic bottle 2. The ROPP shell 9 covers the bottle threads 8. A pilfer band 18 of the ROPP shell 9 extends downward past a skirt 30 of the metallic bottle 2.

Referring now to FIG. 1C, a capping apparatus 22 subsequently performs three operations, including: (1) reforming the top portion 20 of the ROPP closure 10 to form a reform or channel 32; (2) forming threads 16 on a portion of the closure body 12; and (3) tucking the pilfer band 18 against the metallic bottle 2. The timing and sequence of these three actions varies between different prior art capping apparatus 22. Generally, one or more of a pressure block ejector 24 and a pressure block 25 apply a load, or "top load," to a top portion 20 of the ROPP closure 10 to press an outer edge of the top portion 20 down around a curl 6 of the metallic bottle 2 creating a reform or channel 32. An interior surface of the channel 32 applies force to a liner 14 within the ROPP closure 10. Accordingly, the liner 14 contacts an exterior of the bottle curl 6 to form an effective seal.

Once sealed, closure threads 16 are formed on the ROPP closure 10 to maintain the seal once the pressure block ejector 24 and the pressure block 25 are removed. The closure threads 16 are formed by a thread roller 26 that applies a "sideload" to the closure body 12. Typically, two thread rollers 26 are used. The thread rollers 26 use the underlying bottle threads 8 as a mandrel. The closure threads 16 are formed as the thread rollers 26 press against and wind down the body portion 12 along the bottle threads 8.

Two pilfer rollers 28 tuck the bottom edge of the ROPP closure 10 against a protrusion, known as the skirt 30, of the metallic bottle 2. In this manner, if the ROPP closure 10 is rotated in an opening direction, the pilfer band 18 is severed to provide visual evidence of tampering. The pilfer rollers 28 also apply a sideload to the metallic bottle 2 to tuck the pilfer band 18 against the bottle skirt 30. In some cases, a metallic bottle 2 may be sealed by a Roll On (RO) closure that does not include a "pilfer proof" feature. An example of a neck portion 4 of a metallic bottle 2 sealed by a ROPP closure 10 is illustrated in FIG. 1D.

Referring now to FIG. 2, sideload 34 and topload 36 forces applied by a prior art capping apparatus 22 are provided in a graphical format. The upper line identifies sideload 34 forces applied by the thread rollers 26 and the pilfer roller 28. The lower line 36 identifies topload force applied during ROPP closure application and reform of the ROPP closure 10 to form the channel 32. The reform topload 36 and thread/pilfer formation sideload 34 are applied by separate cams of the capping apparatus 22 simultaneously. Said another way, the sideload 34 and topload 36 forces begin and end at approximately identical times. Both the topload 36 and sideload 34 forces are constant during the ROPP closure 10 application process. The sideload 34 is momentarily reduced about half-way through the capping process proximate to point 35 to allow the thread rollers 26 to spring back to an initial position proximate to the curl 6 so that the closure threads 16 may be formed a second time.

Referring now to FIG. 3, a graph of sideload 38 and topload 40 forces applied by another prior art capping apparatus 22 is provided. The application of the topload 40 applied to the metallic bottle 2 by the pressure block ejector 24 is used to actuate spring loaded roller arms associated with the thread rollers 26 and the pilfer rollers 28. The two actions are driven by a single cam and are not separable. Accordingly, the sideload 38 and topload 40 forces begin and end at approximately identical times. Due to the shape of the cam, the topload 40 initially spikes proximate to point 41 as the pressure block ejector 24 engages and applies the topload to the top portion 20 of the ROPP closure 10. The spike of the topload 40 is approximately 15% of the total topload 40. The sideload 38 and the topload 40 are both interrupted about half-way through the closure application process proximate to point 39 to allow the thread rollers 26 to spring back to their initial position proximate to the curl 6 so that the closure threads 16 may be formed a second time.

Glass bottles sealed with ROPP closures using a similar apparatus typically receive a cumulative load of at least 500 pounds. In contrast, the topload applied by the pressure block ejector 24 and pressure block 25 and the sideloads applied by the rollers 26, 28 to seal metallic bottles 2 formed of aluminum are reduced compared to the forces used to seal glass bottles. For example, prior art capping apparatus 22 used to seal metallic bottles 2 formed of aluminum with ROPP closures 10 generally reduce the cumulative load to about 380 pounds and reduce the load range to +/−5% lbs since the aluminum bottles are more prone to deformation or collapse.

Failures are possible when a greater than the nominal topload is used with a nominal sideload. For example, when too much force is applied by a capping apparatus 22 during sealing of a metallic bottle 2 with a ROPP closure 10, one or more of the bottle threads 8 and the skirt portion 30 of the metallic bottle 2 may collapse. Another failure observed when too much topload is used is deformation of the metallic bottle 2. For example, a cross-sectional shape of the neck portion 4 of the metallic bottle 2 may be deformed from a preferred generally circular shape to a non-circular shape such as an oval or an ellipse. Still another failure associated with the use of too much topload is ROPP closures 10 that are undesirably difficult to remove from metallic bottles 2.

Failures also occur when less than the nominal topload is used with a nominal sideload to seal a metallic bottle 2. A less than nominal topload may result in a failure due to substandard sealing of the metallic bottle 2. For example, when a less than nominal topload is used, the closure channel 32 may have an inconsistent shape or an inadequate depth. This can result in insufficient contact of the ROPP liner 14 with the bottle curl 6 and a failure to seal the metallic bottle 2. Another failure caused by the use of too little topload is loss of seal of the metallic bottle 2 by movement of the ROPP closure 10. This can result in venting of the content of the metallic bottle 2.

Referring now to FIG. 4, current production capping loads generated by a prior art capping apparatus 22 are plotted to illustrate a cumulative load failure region 42 above a failure threshold 44 line. The combined sideload force generated by two thread rollers 26 and two pilfer rollers 28 is plotted on the X-axis in pounds. The topload force generated by the pressure block ejector 24 and the pressure block 25 are plotted on the Y-axis in pounds. A nominal load 46 for a known capping apparatus 22 includes a topload force of about 250 pounds from the pressure block ejector 24 and pressure block 25 and a sideload force of about 86 pounds (comprising sideload forces applied by each of two thread rollers 26 and by each of the two pilfer rollers 28). Although less than the cumulative load applied to glass bottles sealed with ROPP closures, these loads are almost excessive for current metallic bottles 2. Further, the nominal load 46 provides less than about 30 pounds of margin 47 before the failure threshold 44 is reached. Accordingly, there is only a small production window that is useful for capping known metallic bottles 2 with prior art capping apparatus 22 and methods. The small production window results in overstress and failures of the metallic bottle 2 or the ROPP closure 10 when the capping apparatus 22 is out of calibration or for marginal metallic bottles 2. Further, because the nominal load 46 applied by the prior art processes and capping apparatus 22 are close to the maximum amount 44 that the metallic bottle 2 can withstand, it is not possible produce a lightweight metallic bottle that can be sealed with a ROPP closure 10 using the prior art processes and capping apparatus 22.

Due to the limitations associated with known methods and prior art apparatus used to seal metallic bottles, there is an unmet need for methods and apparatus of sealing metallic bottles that apply less force to the metallic bottle to achieve a seal. There is also an unmet need for methods and apparatus of sealing metallic bottles that may be used to seal metallic bottles formed with thinner bodies and less material (hereinafter "light-weight" metallic bottles).

SUMMARY OF THE INVENTION

The present invention provides novel apparatus and methods that apply less simultaneous force to metallic bottles during the sealing of the metallic bottles than prior art sealing apparatus and methods. It is one aspect of the present invention to provide a novel method and apparatus that applies a reduced top load and side load during the sealing of a metallic bottle with a ROPP closure.

Another aspect of the present invention is a novel method and apparatus that applies a cumulative force of less than about 320 pounds to a metallic bottle as the metallic bottle is sealed with a ROPP closure. The cumulative force is the sum of the top load force and each individual side load force applied simultaneously by a capping apparatus of the present invention during the sealing of a metallic bottle. In one embodiment, the cumulative force is limited to no more than about 320 pounds by performing at least some of the operations that generate sideloads and toploads independently. Said another way, at least some of the sideloads and toploads generated by the capping apparatus of the present invention do not occur simultaneously.

Still another aspect is to provide a method and apparatus in which the topload is reduced after a pressure block of a capping apparatus of the present invention forms a channel in a ROPP closure positioned on a metallic bottle. In one embodiment, after an initial maximum topload force is applied by the capping apparatus, the topload force is decreased to a minimum amount sufficient to maintain a seal between the metallic bottle and the ROPP closure while operations generating sideload forces are performed.

It is another aspect of the present invention to provide a method and capping apparatus that rotates a ROPP closure in a closing direction by a predetermined amount. Optionally, the ROPP closure may be rotated after closure thread formation is completed. In one embodiment, the ROPP closure is rotated in the closing direction during the formation of the closure threads. For example, in one embodiment, the ROPP closure is rotated in the closing direction when the closure threads are partially formed. In another embodiment, the ROPP closure is rotated after each thread forming pass of the thread rollers. Optionally, the ROPP closure may be rotated in the closing direction before or after pilfer rollers tuck a pilfer band against a skirt of the metallic bottle. In one embodiment, the topload force is decreased after the ROPP closure is rotated. Optionally, the topload force may be decreased during the tucking of the pilfer band by the pilfer rollers. Alternatively, the method and capping apparatus may rotate the metallic bottle such that an uppermost portion of the metallic moves closer to a top portion of the ROPP closure before or after the closure threads are completely formed.

Another aspect of the present invention is a method and a capping apparatus that increases the number of forming passes performed by thread rollers to form closure threads on a ROPP closure. In one embodiment, the capping apparatus includes more thread rollers than prior art capping apparatus. In another embodiment, the capping apparatus includes two thread rollers that each perform three or more passes to form the closure threads. Each thread roller of the capping apparatus of the present invention applies less sideload force to the ROPP closure and metallic bottle than prior art thread rollers.

One aspect of the present invention is a capping apparatus to seal a bottle having a threaded neck with a ROPP closure. The capping apparatus includes, but is not limited to: (1) a pressure block ejector that applies a predetermined first topload to a top portion of the ROPP closure to at least partially press a liner within the ROPP closure against a curl positioned on an upper portion of the threaded neck of the bottle; (2) a pressure block that applies a predetermined second topload the top portion of the ROPP closure to form a channel with a predetermined depth in an outer radial edge of the ROPP closure; (3) at least one thread roller configured to apply a predetermined first sideload to an exterior surface of a body portion of the ROPP closure to form closure threads on the body portion, wherein the capping apparatus is configured to rotate at least one of the ROPP closure and the bottle around a longitudinal axis of the bottle to drive the curl further into the liner after the closure threads are at least partially formed; and (4) at least one pilfer roller configured to apply a predetermined second sideload to a pilfer band of the ROPP closure, wherein the bottle is sealed by the ROPP closure. The bottle may be formed of one of aluminum, plastic, and glass.

In one embodiment, the pressure block is configured to apply and release the second topload to the top portion of the ROPP closure before the at least one thread roller applies the first sideload. In another embodiment, the first topload is applied by one or more of the pressure block ejector and the pressure block.

In one embodiment, the at least one thread roller is configured to apply the first sideload while the pressure block ejector applies the first topload to seal the bottle with the ROPP closure. Optionally, the second sideload is applied to the ROPP closure at a different time than the first sideload.

In one embodiment, one or more of the pressure block ejector and the pressure block are configured to rotate the ROPP closure axially in a closing direction after the closure threads are at least partially formed. Optionally, the capping apparatus further comprises a tool configured to rotate the bottle in a closing direction around the longitudinal axis of the bottle. In one embodiment, the tool comprises at least one of a chuck positioned proximate to a closed end portion of the bottle and a holder that engages a body portion of the bottle.

In one embodiment, the at least one thread roller forms the closure threads in three or more passes. In another embodiment, the first topload applied to the ROPP closure by the pressure block ejector is not greater than about 200 pounds. In another embodiment, the first sideload applied to the ROPP closure by each of the at least one thread rollers is not greater than about 30 pounds and the second sideload applied to the ROPP closure by each of the at least one pilfer rollers is not greater than about 35 pounds. In another embodiment, a cumulative load including the first topload and one of the first sideload and the second sideload is not greater than about 320 pounds.

In one embodiment, the channel formed by the channel has a depth of less than about 0.1 inches. More preferably, the channel has a depth of less than about 0.05 inches.

It is another aspect of the present invention to provide a method of interconnecting and sealing a ROPP closure to a threaded neck of a bottle. The method generally comprises: (1) positioning the ROPP closure on the threaded neck of the bottle; (2) applying a first topload to an upper portion of the ROPP closure with a pressure block ejector of a capping apparatus, the first topload at least partially compressing a liner within the ROPP closure against a curl positioned on an upper portion of the threaded neck of the bottle to seal an opening of the bottle; (3) applying a first sideload with at least one thread roller of the capping apparatus to an exterior surface of a body portion of the ROPP closure, the first sideload forming closure threads on the body portion while the pressure block ejector continues to apply the first topload to maintain the seal; (4) after forming the closure threads, rotating at least one of the bottle and the ROPP closure such that a distance between an interior surface of the closure upper portion and the curl is decreased; and (5) applying a second sideload with at least one pilfer roller of the capping apparatus to a pilfer band of the ROPP closure while the pressure block ejector continues to apply the first topload, wherein the bottle is sealed by the ROPP closure. The bottle may be formed of one of aluminum, plastic, and glass. Optionally, the method may further comprise applying a second topload by a pressure block of the capping apparatus to form a channel in an outer radial edge of the ROPP closure, the second topload being greater than the first topload.

In one embodiment, the first sideload and the second sideload are applied sequentially. In another embodiment, the first sideload is applied by the at least one thread roller during three or more contacts with the ROPP body portion and the second sideload is applied by the at least one pilfer roller during three or more different contacts with the pilfer band. Optionally, the first topload comprises a force applied by each of the pressure block ejector and the pressure block.

Another aspect of the present invention is a method of sealing an open end of a threaded bottle with a closure. The method includes, but is not limited to: (1) positioning the closure on a threaded neck of the threaded bottle; (2) applying a first topload to an exterior surface of a top portion of the closure to seal the threaded bottle; (3) while the first topload is applied to the closure, forming threads on the closure; and (4) after forming the threads on the closure, rotating at least one of the closure and the threaded bottle around a longitudinal axis of the threaded bottle such that an uppermost portion of the open end of the threaded bottle is moved closer to the exterior surface of the top portion of the closure. The threaded bottle may be formed of one of aluminum, plastic, and glass.

In one embodiment the method further comprises, before forming the threads on the closure, applying a second topload to a portion of the closure to form a channel in an outer radial edge of the closure, wherein the second topload is greater than the first topload. Optionally, the method may further comprise, after rotating at least one of the closure and the threaded bottle, tucking a pilfer band of the closure proximate to a skirt portion of the threaded bottle. In another embodiment, the method comprises, before rotating at least one of the closure and the threaded bottle, tucking a pilfer band of the closure proximate to a skirt portion of the threaded bottle.

Yet another aspect of the present invention is a metallic bottle sealed by a ROPP closure with a capping apparatus of an embodiment of the present invention that applies less cumulative force to the metallic bottle than prior art capping apparatus. The metallic bottle includes, but is not limited to: (1) a bottom portion that is closed; (2) a body portion extending upwardly from the bottom portion; (3) a neck portion with a reduced diameter extending upwardly from the body portion; (4) bottle threads formed on a portion of the neck portion; (5) an opening positioned on an uppermost portion of the neck portion; and (6) a ROPP closure that seals the opening, the ROPP closure including a channel and closure threads formed by a capping apparatus. Optionally, in one embodiment of the present invention, at least one of the ROPP closure and the metallic bottle are rotated in a closing direction after the closure threads are at least partially formed such that a distance from the bottom portion of the metallic bottle to an exterior surface portion of the ROPP closure is decreased.

In one embodiment, the metallic bottle is a light-weight metallic bottle comprising less metallic material and less mass than known metallic bottles sealed with a ROPP closure. This is made possible because the ROPP closure can be interconnected to the threaded neck of the bottle with less force by the capping apparatus. More specifically, the capping apparatus may form a channel that has a decreased depth compared to channels formed by known capping apparatus. In another embodiment, by rotating one of the ROPP closure and the metallic bottle, the capping apparatus applies less force to the light-weight metallic bottle compared to known capping apparatus. In one embodiment, the capping apparatus applies a cumulative force of less than about 320 pounds to the light-weight metallic bottle. In one embodiment, the light-weight metallic bottle has a mass of less than about 0.820 oz. In another embodiment, the mass of the light-weight metallic bottle is less than about 0.728 oz. In still another embodiment, the mass of the light-weight metallic bottle is at least about 5% less than the mass of known metallic bottles of the same size.

In an embodiment, at least a portion of the light-weight metallic bottle has a thickness that is no more than approximately 95% of the thickness of a corresponding portion of a known metallic bottle formed of the same material. In another embodiment, the light-weight metallic bottle has a column strength that is no greater than approximately 91% of the column strength of a known metallic bottle formed of the same material. In yet another embodiment, the light-weight metallic bottle is comprised of an alloy that has a column strength that is no greater than approximately 85% of the column strength of known alloys used to form metallic bottles.

In one embodiment, the bottle threads have a pitch of between about 0.10 inches and about 0.15 inches. In one embodiment, the bottle threads have an exterior diameter of between approximately 1.0 inches and approximately 1.6 inches. In still another embodiment, the metallic bottle has a diameter of between about 2.5 inches and about 2.85 inches. In yet another embodiment, the metallic bottle has a height of between about 6.0 inches and about 7.4 inches.

In an embodiment of the present invention, the ROPP closure includes a body portion on which the closure threads are formed by the capping apparatus, a pilfer band at a lowermost portion of the body portion, a top portion in which the channel is formed by the capping apparatus, and a liner interconnected to an interior surface of the top portion. Optionally, in anther embodiment, the ROPP closure has an interior diameter of between about 0.90 inches to about 1.5 inches.

In one embodiment, the metallic bottle is configured to store a pressurized beverage with a maximum internal pressure of up to about 100 pounds per square inch without unintended venting of product from the metallic bottle. In another embodiment, the maximum internal pressure is up to about 135 pounds per square inch without failure or blow-off of the ROPP closure.

It is one aspect of the present invention to provide a capping apparatus to seal a bottle having a threaded neck with a ROPP closure. The capping apparatus includes, but is not limited to: (1) a pressure block and a pressure block ejector that apply a predetermined first topload to at least an exterior surface of the ROPP closure to at least partially press a liner within the ROPP closure against a curl positioned on an upper portion of the threaded neck of the bottle; (2) at least one thread roller configured to apply a predetermined first sideload to an exterior surface of a body portion of the ROPP closure to form closure threads on the body portion while at least one of the pressure block and the pressure block ejector continue to apply the first topload to the exterior surface of the ROPP closure. The bottle is sealed by the ROPP closure and the capping apparatus releases the pressure block and the pressure block ejector and the associated first topload from the exterior surface of the ROPP closure. Optionally, in one embodiment, the capping apparatus is configured to rotate at least one of the ROPP closure and the bottle axially around a longitudinal axis of the bottle such that an uppermost portion of the bottle moves closer to the liner within the ROPP closure.

In one embodiment, the capping apparatus further comprises at least one pilfer roller. The at least one pilfer roller is configured to apply a predetermined second sideload to a pilfer band of the ROPP closure adjacent to a skirt of the bottle while at least one of the pressure block and the pressure block ejector continue to apply the first topload to the exterior surface of the ROPP closure. In one embodiment, the first sideload and the second sideload are applied to the ROPP closure substantially simultaneously. In another embodiment, when the pressure block is applying a second topload to the ROPP closure that is greater than the first topload, the second sideload is applied to the ROPP closure at a different time than the first sideload.

The ROPP closure includes a channel with a predetermined depth formed in an outer radial edge. In one embodiment, the pressure block applies a predetermined second topload to the exterior surface of the ROPP closure to form the channel after the ROPP closure is positioned on the threaded neck of the bottle. In one embodiment, the pressure block is configured to apply and release the second topload before the at least one thread roller applies the first sideload. Optionally, the at least one thread roller is configured to apply the first sideload while the pressure block applies the second topload to seal the bottle with the ROPP closure. In another embodiment, at least one pilfer roller is configured to apply a predetermined second sideload to a pilfer band of the ROPP closure after the at least one thread roller stops applying the first sideload and while the pressure block and the pressure block ejector apply the first topload to the ROPP closure.

In one embodiment, the at least one thread roller forms the closure threads in three or more passes. In another embodiment, the at least one pilfer roller tucks the pilfer band against the ROPP closure in three or more passes.

In one embodiment, the bottle is one of a lightweight aluminum bottle and a plastic bottle. In another embodiment, the bottle is formed of one of aluminum, plastic, and glass.

In one embodiment, the topload applied to the ROPP closure by the pressure block ejector is not greater than about 200 pounds. In a more preferred embodiment, the topload applied by the pressure block ejector is less than about 175 pounds. Optionally, the first sideload applied to the ROPP closure by each of the at least one thread rollers is not greater than about 30 pounds and the second sideload applied to the ROPP closure by each of the at least one pilfer rollers is not greater than about 35 pounds. In another embodiment, the first sideload applied by each of the at least one thread rollers is between about 15 pounds and about 35 pounds. In still another embodiment, the second sideload applied by each of the at least one pilfer rollers is between about 15 pounds and about 35 pounds. Additionally, in one embodiment, a cumulative load including the topload and one of the first sideload and the second sideload is not greater than about 320 pounds. More preferably, the cumulative load is between about 150 and about 350 pounds.

It is another aspect of the present invention to provide a method of interconnecting and sealing a ROPP closure to a threaded neck of a bottle. The method generally comprises: (1) positioning the ROPP closure on the threaded neck of the bottle; (2) applying a first topload with a pressure block and a pressure block ejector of a capping apparatus to at least an upper portion of an exterior surface of the ROPP closure, the first topload at least partially compressing a liner within the ROPP closure against a curl positioned on an upper portion of the threaded neck of the bottle to seal an opening of the bottle; (3) applying a second topload with a pressure block to an upper portion of the exterior surface of the ROPP closure to form a channel with a predetermined depth in an outer radial edge of the ROPP closure; (4) applying a first sideload with at least one thread roller of the capping apparatus to an exterior surface of a body portion of the ROPP closure, the first sideload forming closure threads on the body portion while the pressure block and the pressure block ejector continue to apply the first topload to maintain the seal; (5) applying a second sideload with at least one pilfer roller of the capping apparatus to a pilfer band of the ROPP shell adjacent to a skirt of the bottle while the pressure block and the pressure block ejector continue to apply the first topload, wherein the bottle is sealed by the ROPP closure; (6) rotating at least one of the ROPP closure and the bottle in a closing direction around a longitudinal axis of the bottle while the pressure block ejector continues to apply the first topload; and (7) releasing the pressure block and the pressure block ejector and the associated first topload from the upper portion of the ROPP closure.

In one embodiment, the first sideload and the second sideload are applied substantially simultaneously. Optionally, the first sideload is applied by the at least one thread roller during two or more contacts with the ROPP body portion and the second sideload is applied by the at least one pilfer roller during two or more different contacts with the ROPP body portion.

In one embodiment, the second topload may be applied to, and release from, the ROPP closure before the at least one thread roller applies the first sideload and the at least one pilfer roller applies the second sideload.

Optionally, the ROPP closure or the bottle may be rotated before the closure threads are completely formed by the at least one thread roller. Optionally, the ROPP closure or the bottle may be rotated one or more different times during or after the formation of the closure threads. In one more preferred embodiment, the closure threads are completely formed before the ROPP closure or the bottle are rotated.

In another embodiment, the at least one thread roller applies the first sideload at three or more different times to form the closure threads. Additionally, in still another embodiment, the at least one pilfer roller applies the second sideload at three or more different times.

In one embodiment, the bottle is a light-weight aluminum bottle that comprises at least one of a decreased gauge and less mass than prior art aluminum bottles of substantially the same size and shape. In another embodiment the bottle is made of plastic. In still another embodiment, the bottle is made of glass.

In one embodiment, the topload applied to the ROPP closure by the pressure block ejector is not greater than about 200 pounds. Optionally, the first sideload applied to the ROPP closure by each of the at least one thread rollers is not greater than about 30 pounds and the second sideload applied to the ROPP closure by each of the at least one pilfer rollers is not greater than about 35 pounds. Additionally, in one embodiment, a cumulative load including the topload and one of the first sideload and the second sideload is not greater than about 320 pounds. More preferably, the cumulative load is between about 150 and about 350 pounds.

Another aspect of the present invention is a method of sealing an open end of a threaded bottle with a closure, comprising: (1) positioning the closure on a threaded neck of the threaded bottle; (2) applying a topload to an exterior surface of a top portion of the closure; (3) while the topload is applied to the closure, forming threads on closure; and (4) after forming the threads on the closure, rotating at least one of the closure and the threaded bottle axially such that an uppermost portion of the open end of the threaded bottle is moved closer to an interior surface of the top portion of the closure.

In one embodiment, the topload comprises a first topload and a second topload. In another embodiment, the first topload presses a curl at the uppermost portion of the open end into a liner positioned within the closure to seal the threaded bottle. The second topload may be applied to form a channel in an outer radial edge of the closure before forming the threads on the closure. The second topload is generally greater than the first topload.

In one embodiment the method includes, after the axial rotation of at least one of the closure and the threaded bottle, tucking a pilfer band of the closure proximate to a skirt portion of the bottle. Alternatively, the pilfer band of the closure may be tucked proximate to the skirt portion of the bottle before the axial rotation of at least one of the closure and the threaded bottle. In one embodiment, the threads are formed on the closure while the pilfer band is tucked proximate to the bottle skirt portion.

In still another aspect of the present invention, a method of sealing a bottle with a ROPP closure is provided. The method includes: (1) positioning the ROPP closure on a threaded neck of the bottle; (2) after positioning the ROPP closure on the bottle, applying a first topload to the ROPP closure to form a channel in an outer radial edge of the ROPP closure; (3) forming closure threads on a body portion of the ROPP closure; and (4) rotating at least one of the ROPP closure and the bottle in a closing direction such that a distance between a lowermost portion of the bottle and an uppermost exterior surface portion of the ROPP closure decreases. Optionally, in one embodiment the method further comprises, after forming the closure threads, reducing the first topload to a second topload that is less than the first topload. Optionally, a pilfer band of the closure may be tucked proximate to a skirt portion of the bottle.

Another aspect of the present invention is a method of sealing a bottle with a ROPP closure, comprising: (1) positioning the ROPP closure on a neck of the bottle; (2) applying a sealing load to the ROPP closure; and (3) while the sealing load is being applied to the ROPP closure: (A) applying a first sideload with at least one thread roller to an exterior surface of a body portion of the ROPP closure to form closure threads on the body portion, wherein the at least one thread roller forms the closure threads in at least three individual passes; and (B) applying a second sideload with at least one pilfer roller to tuck a pilfer band of the ROPP closure proximate to a skirt portion of the bottle, wherein the at least one pilfer roller tucks the pilfer band in at least three individual passes.

The method may optionally include, after positioning the ROPP closure on the bottle, applying a reform load to the ROPP closure to form a channel in the outer radial edge of the ROPP closure. In one embodiment the method includes, after forming the channel, releasing the reform load before applying the sealing load to the ROPP closure. In another embodiment the method further comprises, after forming the closure threads, axially rotating at least one of the ROPP closure and the bottle to move an uppermost portion of the neck of the bottle closer to an interior surface of an upper portion of the ROPP closure.

Although generally referred to herein as a "beverage bottle," "metallic beverage bottle," "metallic container," "beverage container," "aluminum bottle," "can," and "container," it should be appreciated that the methods and apparatus described herein may be used to seal containers of any size or shape and that are formed of any material, including, but not limited to metal, plastic, and glass containers including, without limitation, beverage cans and beverage bottles. Accordingly, the term "container" is intended to cover containers of any type and formed of any material that are subsequently sealed with a Roll-On Pilfer Proof (ROPP) closure. Further, as one who is skilled in the art will appreciate, the methods and apparatus of the present invention may be used for any type of metallic container and are not specifically limited to a beverage container such as a soft drink or beer can.

As used herein, the phrase "light-weight metallic bottle" refers to a metallic bottle formed of a reduced amount of metal material than prior art metallic bottles. Accordingly, light-weight metallic bottles have a reduced material thickness in one or more predetermined portions of the metallic bottle compared to prior art metallic bottles. In some embodiments, the light-weight metallic bottle is both thinner (i.e., less gage) and has less mass than prior art metallic bottles. In one embodiment, at least a portion of the metallic bottle has a thickness that is approximately 95% of the thickness of a corresponding portion of a prior art metallic bottle formed of the same material. In another embodiment, the light weight metallic bottle has a column strength that is about 91% of the column strength of a prior art metallic bottle form of the same material. In embodiments, the metal material comprises aluminum. In one embodiment, a light-weight metallic bottle is comprised of a different aluminum alloy than prior art metallic bottles comprised of aluminum alloys. For example, in one embodiment the light-weight metallic bottle is comprised of an alloy that has a column strength that is about 85% of the column strength of prior art alloys used to form metallic bottles. It will be appreciated by one of skill in the art that a light-weight metallic bottle formed of even slightly less material compared to a prior art metallic bottle will save manufacturers, bottlers, and shippers millions of dollars annually based on the billions of metallic bottles currently produced annually. Similarly, forming metallic bottles of even a marginally less expensive alloy will result in a significant annual cost reduction for manufacturers and bottlers.

The terms "metal" or "metallic" as used hereinto refer to any metallic material that may be used to form a container, including without limitation aluminum, steel, tin, and any combination thereof. However, it will be appreciated that the apparatus and method of the present invention may be used to seal containers formed of any material, including paper, plastic, and glass containers.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The Summary of the Invention is neither intended, nor should it be construed, as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF THE DRAWINGS

The accompanying drawings, which are incorporated herein and constitute a part of the specification, illustrate embodiments of the invention and together with the Summary of the Invention given above and the Detailed Description given below serve to explain the principles of these embodiments. In certain instances, details that are not necessary for an understanding of the disclosure or that render other details difficult to perceive may have been omitted. It should be understood, of course, that the present invention is not necessarily limited to the particular embodiments illustrated herein. Additionally, it should be understood that the drawings are not necessarily to scale.

Figure 1B:
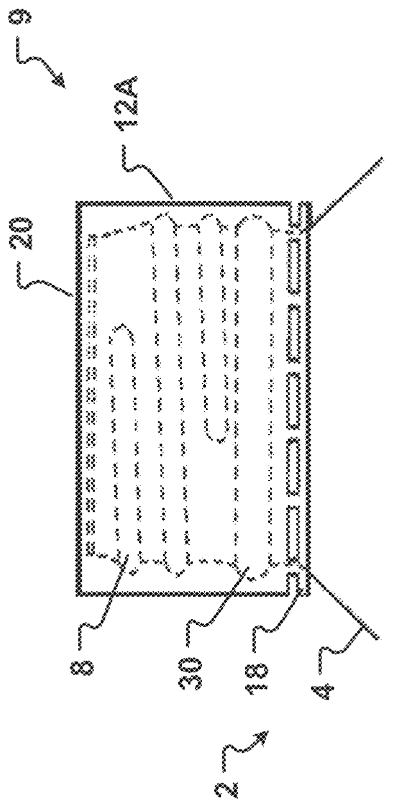
Fig. 1B (Prior Art)
FIGS. 1A-1D illustrate a method of sealing a metallic bottle with a ROPP closure using a prior art capping apparatus.
Figure 1A:
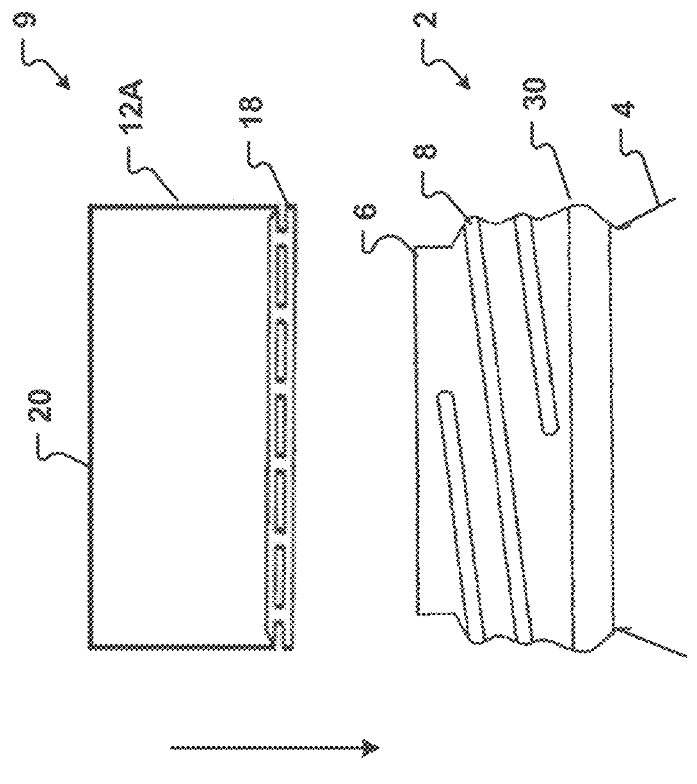
Fig. 1A (Prior Art)
Figure 1C:
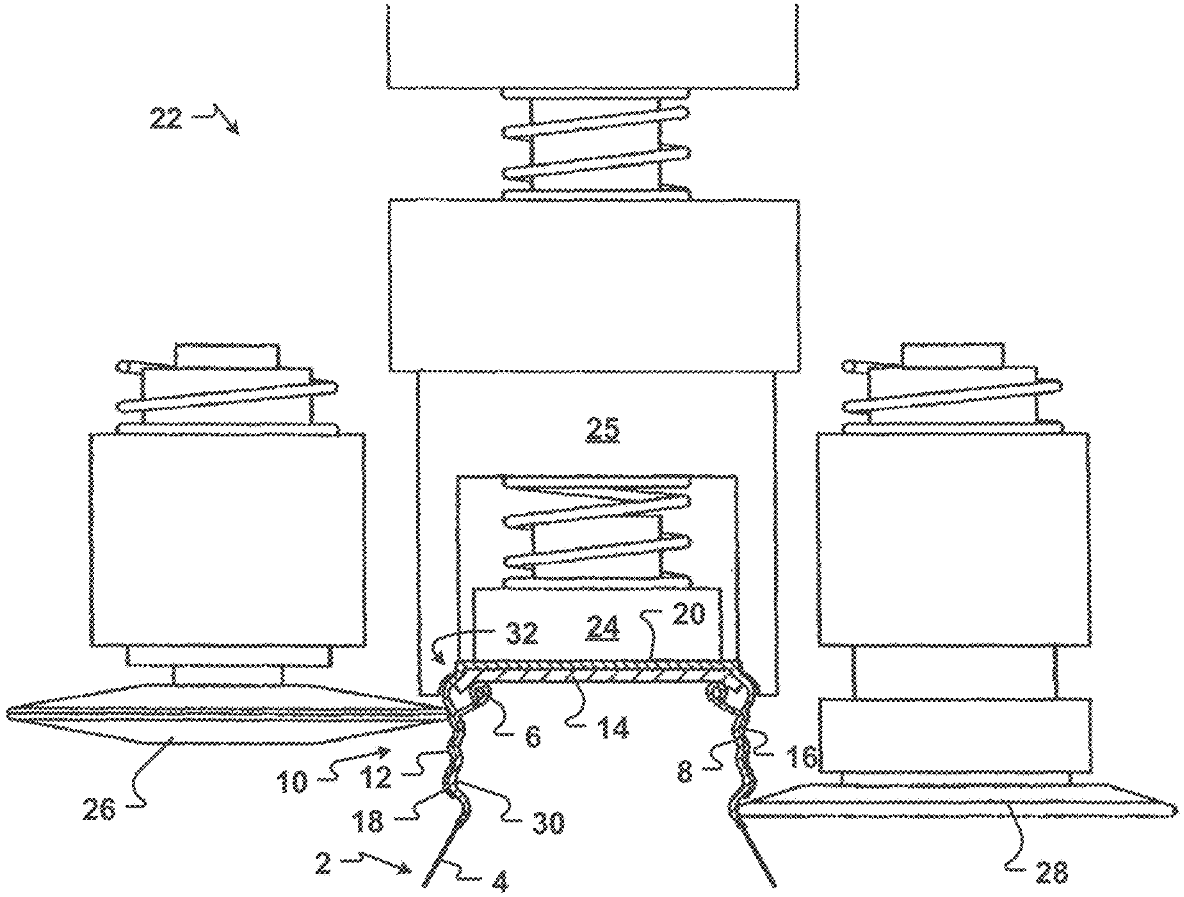
Fig. 1C (Prior Art)
Figure 1D:
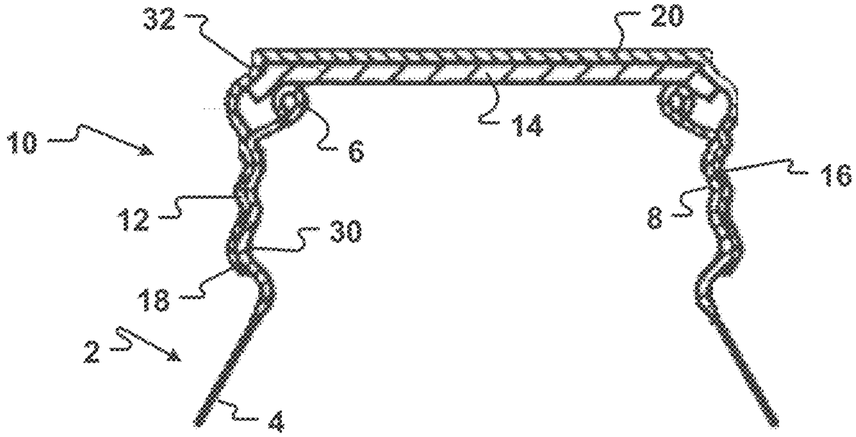
Fig. 1D (Prior Art)
Figure 2:
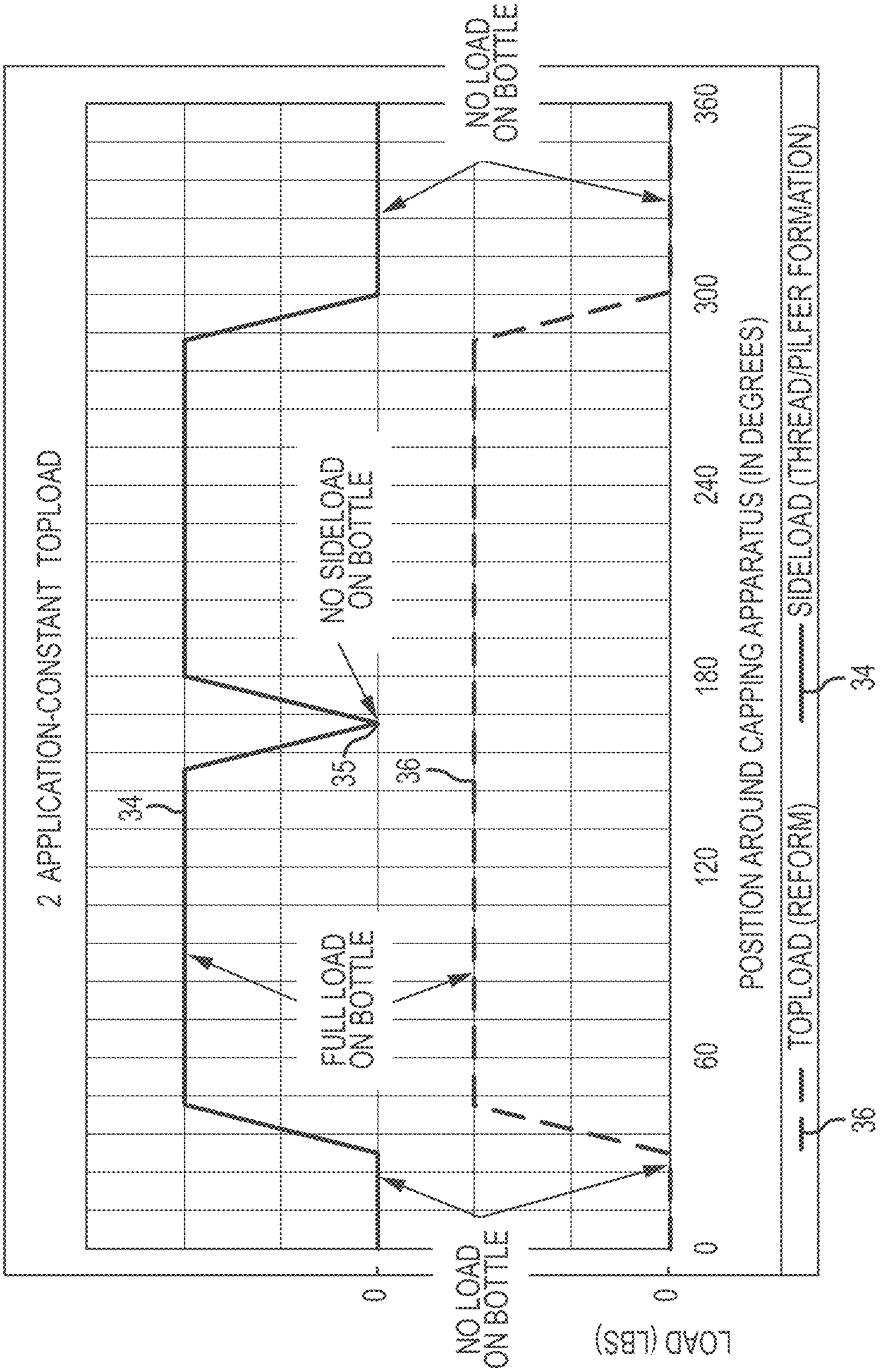
FIG.2 (PRIOR ART)
FIG. 2 is a graph of the forces applied to a metallic bottle during sealing with a ROPP closure using a prior art capping apparatus.
Figure 3:
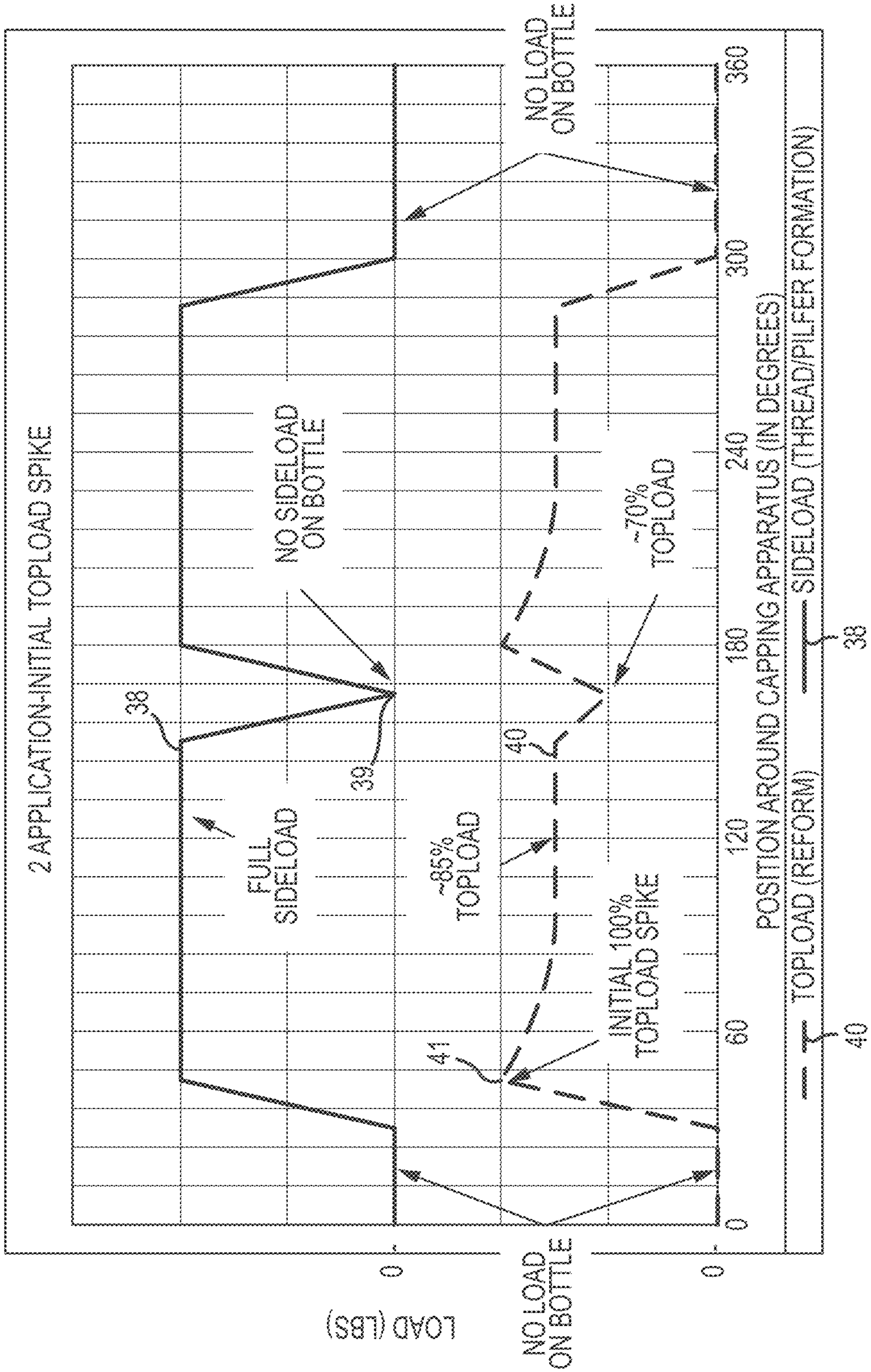
FIG.3 (PRIOR ART)
FIG. 3 is another graph of the forces applied by another prior art capping apparatus to a metallic bottle during sealing of the metallic bottle with a ROPP closure.

To assist in the understanding of one embodiment of the present invention the following list of components and associated numbering found in the drawings is provided herein:

Number Component
2 Metallic bottle
4 Neck portion
6 Curl
8 Bottle threads
9 ROPP shell
10 ROPP closure
12 Body portion of ROPP closure
14 ROPP liner
16 Closure threads
18 Pilfer band
20 Top portion of ROPP closure
22 Prior art capping apparatus
24 Pressure block ejector
25 Pressure block
26 Thread roller
28 Pilfer roller
30 Skirt of metallic bottle
32 Channel of closure
34 Sideload force
35 Roller re-set point
36 Topload force
38 Sideload force
39 Roller re-set point
40 Topload force
41 Initial spike
42 Failure region
44 Failure threshold
46 Nominal load
47 Margin between nominal load and failure threshold
64 Chuck
66 Holder
68 Capping apparatus
70 Pressure block ejector
72 Pressure block
74 Contact surface of pressure block
76 Thread roller
78 Pilfer roller
80 Metallic bottle
81 Longitudinal axis of the metallic bottle
82 Skirt
83 Closing direction of metallic bottle
84 Neck
85 Body portion
86 Curl
87 Closed end portion
88 Bottle threads
90 Opening
92 ROPP closure
93 Closing direction of ROPP closure
94 Pilfer band

96 Body portion of ROPP closure
98 Closure threads
100 ROPP liner
102 Channel of closure
104 Top portion of ROPP closure
106 Beginning contact point
108 Extend of vertical contact
110 Final contact point
112 Region of vertical contact
114 Depth of closure Channel
116 Graph
118 Sideload
120 Topload
122 Maximum topload
124 Topload to maintain seal
126 First sideload
128 Beginning of roller reset
130 No roller contact
132 Roller reset and contact
134 Graph of cumulative failure load
136 Failure region
138 Failure threshold
140 Maintain seal
142 Create closure Channel
144 Sideload force
146 Cumulative force produced by prior art capping apparatus
150 Method of sealing a metallic bottle with a capping apparatus
151 Start operation
153 Generate seal
156 Maintain seal
158 Thread roller applies sideload
160 Pilfer roller applies sideload
162 Rotate ROPP closure in closing direction
164 Determine if sideload operations and/or closure rotation repeat
166 Discharge
168 End operation

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Figure 5:
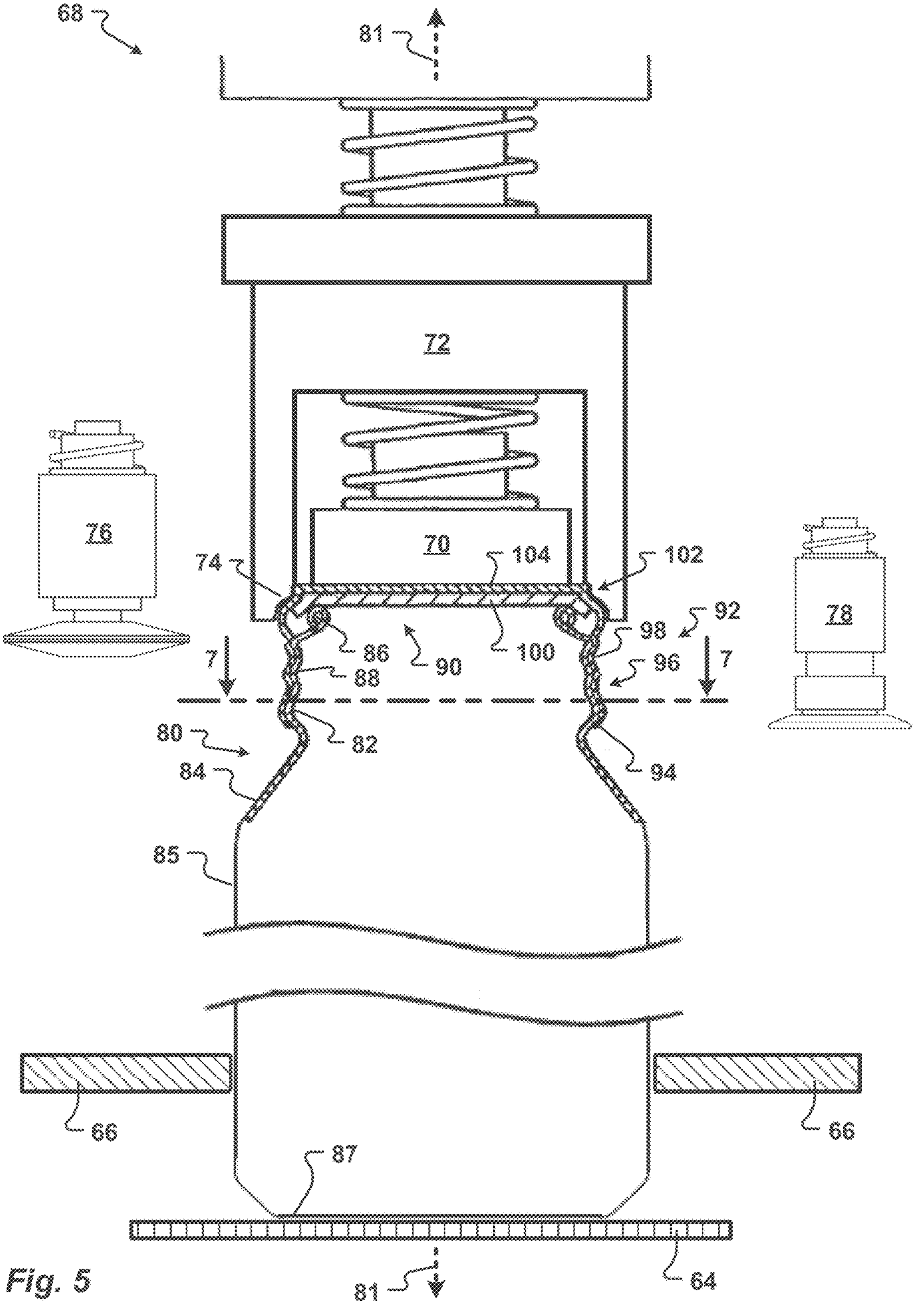
FIG. 5 is a partial front elevation view of a capping apparatus of one embodiment of the present invention and depicting the neck of a metallic bottle sealed with a ROPP closure by the capping apparatus.

Referring now to FIG. 5, a capping apparatus 68 of an embodiment of the present invention is illustrated. The capping apparatus 68 generally includes a pressure block ejector 70, a pressure block 72 with a contact surface 74, at least one thread roller 76, and at least one pilfer roller 78. In one embodiment, at least one of the pressure block ejector

70 and the pressure block 72 are configured to rotate axially around a longitudinal axis 81 of a metallic bottle 80. Optionally, the capping apparatus 68 may include from one to five thread rollers 76. In one embodiment, at least one of the thread rollers 76 has a different thread forming profile than the other thread rollers 76. Optionally, each of the thread rollers 76 may apply different sideload forces during the formation of the closure threads 98. Additionally, from one to five pilfer rollers 78 may be included with the capping apparatus 68.

The capping apparatus 68 may be used to seal a metallic bottle 80 with a ROPP closure 92 that starts as a ROPP shell 9. In one embodiment, the metallic bottle 80 is the same as, or similar to, the prior art metallic bottle 2. In another embodiment, the metallic bottle 80 is a light-weight metallic bottle formed of at least one of less, lighter, and different metallic material than the prior art metallic bottle 2. In one embodiment, at least a portion of the light-weight metallic bottle 80 is at least about 5% thinner than a similar portion of a prior art metallic bottle 2. In another embodiment, the column strength of the light-weight metallic bottle 80 is at least about 8% less than the column strength of the prior art metallic bottle 2. In yet another embodiment, the alloy used to form the light-weight metallic bottle 80 has a column strength that is at least about 15% less than the column strength of the alloy used to form the prior art metallic bottle 2. In one embodiment, the light-weight metallic bottle 80 has a mass of less than about 0.820 oz. In another embodiment, the mass of the light-weight metallic bottle 80 is less than about 0.728 oz.

The metallic bottle 80 generally includes a closed end portion 87, a body portion 85 extending from the closed end portion 87, a neck portion 84 with a reduced diameter, a skirt 82 on the neck portion 84, a curl 86 at an uppermost portion of the neck portion 84, threads 88 generally positioned between the skirt 82 and the curl 86, and an opening 90 positioned at an uppermost portion of the neck portion 84. The metallic bottle 80 may include any number of threads 88 that each have a predetermined size, shape, and pitch. In one embodiment of the present invention, the bottle threads 88 have a pitch of between about 0.10 inches and about 0.15 inches. In another embodiment, the bottle threads 88 have an exterior diameter of between approximately 1.0 inches and approximately 1.6 inches.

The threads 88 may be integrally formed on the neck portion 84. Alternatively, the threads 88 may be formed on an outsert that is interconnected to the neck portion 84 as described in U.S. Patent Application Publication No. 2014/0263150 which is incorporated herein in its entirety. Other methods and apparatus used to form threads on metallic containers are described in U.S. Patent Application Publication No. 2012/0269602, U. S. Patent Application Publication No. 2010/0065528, U.S. Patent Application Publication No. 2010/0326946, U.S. Pat. Nos. 8,132,439, 8,091,402, 8,037,734, 8,037,728, 7,798,357, 7,555,927, 7,824,750, 7,171,840, 7,147,123, 6,959,830, and International Application No. PCT/JP2010/072688 (publication number WO/2011/078057), which are all incorporated herein in their entirety by reference The body portion 85 of the metallic bottle 80 may have any desired size or shape. For example, in one embodiment, the body portion 85 has a generally cylindrical shape. The bottom portion 87 may include an inward dome. The body portion 85 may include a waist portion with a reduced diameter. In one embodiment, the waist portion includes an inwardly tapered cross-sectional profile. In another embodiment, the body portion 85 of the metallic bottle 80 has a diameter of between about 2.5 inches and about 2.85 inches. In yet another embodiment, the metallic bottle 80 has a height of between about 6.0 inches and about 7.4 inches.

The metallic bottle 80 is illustrated in FIG. 5 after being sealed by the capping apparatus 68 with a ROPP closure 92. The thread roller 76 and the pilfer roller 78 are illustrated in an optional disengaged position for clarity. The ROPP closure 92 may be formed from a prior art ROPP shell 9. The ROPP closure 92 generally includes a pilfer band 94 at a lowermost portion of a body portion 96, threads 98 formed on a portion of the body portion 96, a liner 100 positioned proximate to an interior surface of a top portion 104, and a channel 102 at a radial edge of the top portion 104.

In operation, the capping apparatus 68, ROPP closure 92, and metallic bottle 80 are brought into a predetermined alignment. In one embodiment, at least one of the pressure block ejector 70 and the pressure block 72 apply a predetermined topload force to at least a portion of an exterior surface of the closure top portion 104. The topload force at least partially compresses the ROPP liner 100 against the curl 86 to form and maintain a seal between the ROPP closure 92 and the metallic bottle 80. Said another way, the bottle curl 86 is at least partially embedded in the ROPP liner 100 by the topload force applied by the capping apparatus 68.

In one embodiment, the contact surface 74 of the pressure block 72 applies a predetermined topload force to a portion of the closure top portion 104 to form the closure channel 102. Generally, a depth 114 (illustrated in FIG. 7) of the closure channel 102 is directly related to the amount of the topload applied by the pressure block 72. Stated otherwise, a channel 102 with a greater depth requires more topload to form than a channel 102 with a decreased depth. In one embodiment, the topload force applied by the contact surface 74 of the pressure block 72 is less than the topload force applied to form the closure channel 32 by the prior art capping apparatus 22. Accordingly, in one embodiment, the channel 102 has less depth 114 than the channel 32 produced by the prior art capping apparatus 22.

The capping apparatus 68 forms the closure threads 98 by pressing the thread rollers 76 against predetermined portions of the closure body portion 96. The thread rollers 76 then wind axially around the bottle longitudinal axis 81 and down the body portion 96 along the bottle threads 88. The thread rollers 76 use the bottle threads 88 as a form for the closure threads 98. The closure threads 98 may be formed during one or more passes of the thread rollers 76. During each pass, the thread rollers 76 may make between about 1.75 to about 2 revolutions axially around the closure body portion 96.

In one embodiment, the capping apparatus 68 includes two thread rollers 76. Optionally, each of the two thread rollers 76 may be configured to apply less of a sideload force than the prior art thread rollers 26. For example, in one embodiment, the two thread rollers 76 each apply less than about 30 lbs of force to the metallic bottle 80 and the ROPP closure 92. In another embodiment the thread rollers 76 each apply between about 15 pounds and about 35 pounds of force. To form the closure threads 98, the two thread rollers 76 may make at least two passes in contact with the body portion 96. In one embodiment, the two thread rollers 76 each make three passes to form the closure threads 98. In another embodiment, four passes by each of the two thread rollers 76 are used to form the closure threads 98. Optionally, the sideload force applied by the two thread rollers 76 may be different for one or more of the at least two passes. For example, in one embodiment, the two thread rollers 76 each apply a first predetermined sideload force on one of the passes and a second predetermined sideload force on a different pass. In one embodiment, a first one of the two thread rollers 76 may optionally apply a different sideload force than a second one of the two thread rollers 76.

Optionally, the capping apparatus 68 includes three or more thread rollers 76. In an embodiment, each of the three or more thread rollers 76 may be configured to apply less sideload force than prior art thread rollers 26. The three or more thread rollers 76 may make one or more passes to form the closure threads 98. In one embodiment in which the capping apparatus 68 includes four thread rollers 76, only one pass by each of the four thread rollers 76 is required to form the closure threads 98.

The pilfer rollers 78 apply a sideload force to the metallic bottle 80 to tuck the pilfer band 94 against the bottle skirt 82. In one embodiment, the pilfer rollers 78 tuck the pilfer band 94 against the bottle skirt 82 either before or after the thread rollers 76 form the closure threads 98. In this manner, the cumulative load applied to the metallic bottle 80 by the capping apparatus 68 is reduced compared to the cumulative load applied by the prior art capping apparatus 22 in which the thread rollers 26 and pilfer rollers 28 apply sideloads simultaneously.

In one embodiment, the thread rollers 76 and the pilfer rollers 78 independently and consecutively form the closure threads 98 and tuck the pilfer band 94. In this embodiment the cumulative load applied to the metallic bottle 80 and the ROPP closure 92 is reduced without decreasing the individual sideloads applied by the thread and pilfer rollers 76, 78 from the current sideloads applied by prior art thread and pilfer rollers 26, 28. Accordingly, in one embodiment, the capping apparatus 68 may seal a light-weight metallic bottle 80 of the present invention with each thread roller 76 applying a sideload of less than about 30 lbs either before or after each pilfer roller 78 applies a sideload of less than about 35 lbs.

Similar to the thread rollers 76, the capping apparatus 68 may have two or more pilfer rollers 78. Each of the pilfer rollers 78 may be configured to apply less sideload force than prior art pilfer rollers 28. For example, in one embodiment, each pilfer roller 78 applies less than about 35 lbs of force to the metallic bottle 80 and the ROPP closure 92. The pilfer rollers 78 may tuck the pilfer band 94 against the bottle skirt 82 in any number of passes. In one embodiment in which the capping apparatus 68 includes three or more pilfer rollers 78, each pilfer roller 78 may make only one pass. In another embodiment, each pilfer roller 78 makes more passes but applies less sideload force than the prior art pilfer rollers 28 of capping apparatus 22. Optionally, at least one pilfer roller 78 of the two or more pilfer rollers applies a different sideload force than the other pilfer rollers 78. Additionally, the pilfer rollers 78 may optionally apply a different sideload force during different passes.

As one who is skilled in the art will appreciate, all metal forming operations involve some amount of spring back after a forming load is removed from a metallic workpiece. In metallic bottle sealing operations, after the topload applied by the pressure block ejector 70 and the pressure block 72 are removed, spring back of the metal of the metallic bottle 80 and or the ROPP closure 92 generally result in movement of the ROPP liner 100 axially along the longitudinal axis 81 and away from the bottle curl 86. In order to maintain the seal between the metallic bottle 80 and the ROPP closure 92, a predetermined amount of contact between the curl 86 and ROPP liner 100 must be maintained despite this spring back.

Figure 6:
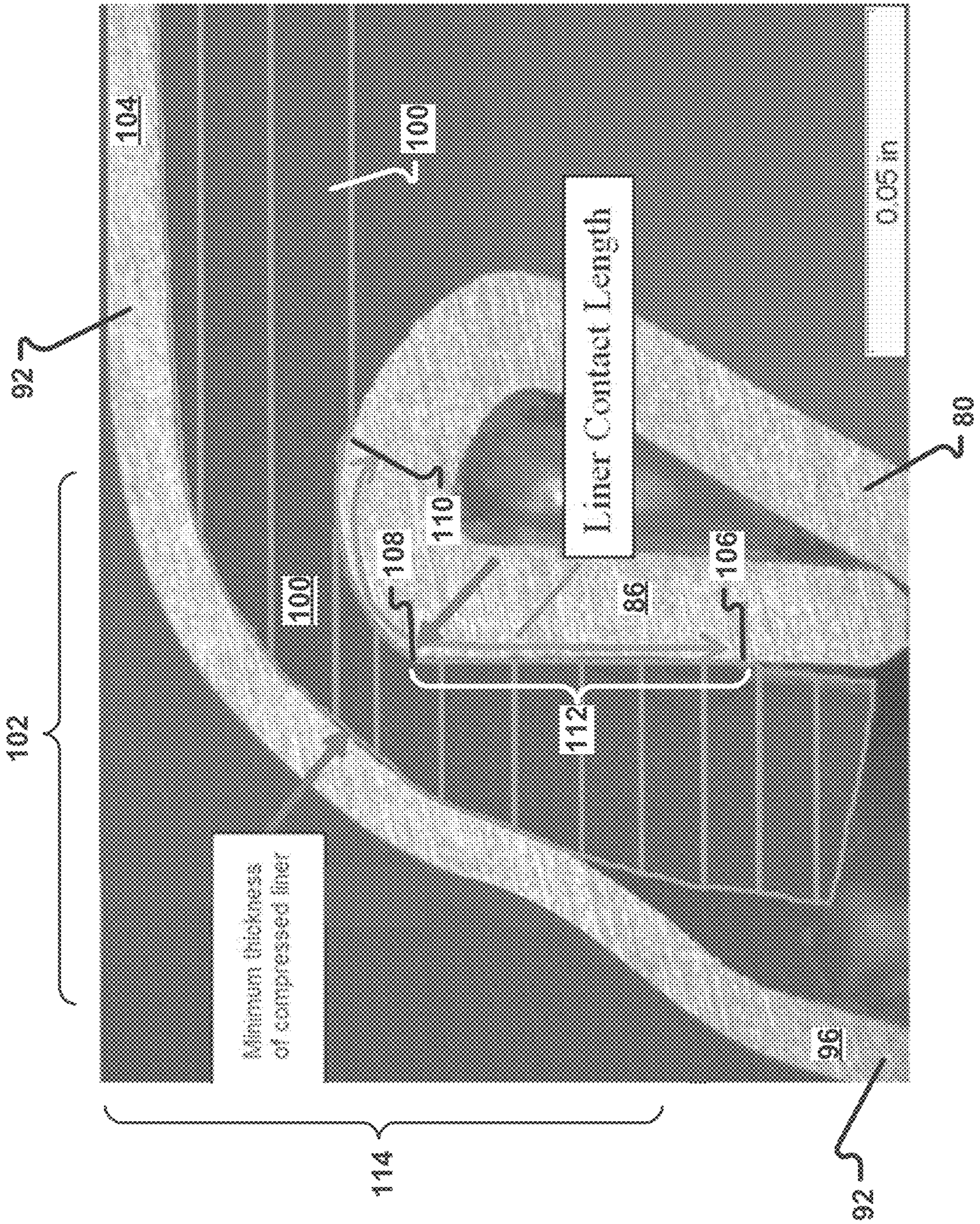
FIG. 6 is a photograph of a cross section of a portion of a metallic bottle curl in contact with a liner within a ROPP closure.

Referring now to FIG. 6, an annotated photograph of portions of the liner 100 between the closure channel 102 of the ROPP closure 92 and the bottle curl 86 are shown. The liner 100 has been outlined for clarity. The liner 100 contacts the curl 86 from approximately point 106 to approximately point 110. A region 112 of vertical contact extends from approximately point 106 to approximately point 108. To maintain the seal between the bottle curl 86 and the ROPP liner 100, the length of the vertical contact region 112 must be greater than a distance of axial travel of the ROPP closure 92 during spring back. The length of the vertical contact region 112 may be increased by increasing the depth 114 of the closure channel 102. However, as described above, to increase the channel depth 114, the topload applied by the pressure block 72 to form the channel 102 must be increased.

Figure 7:
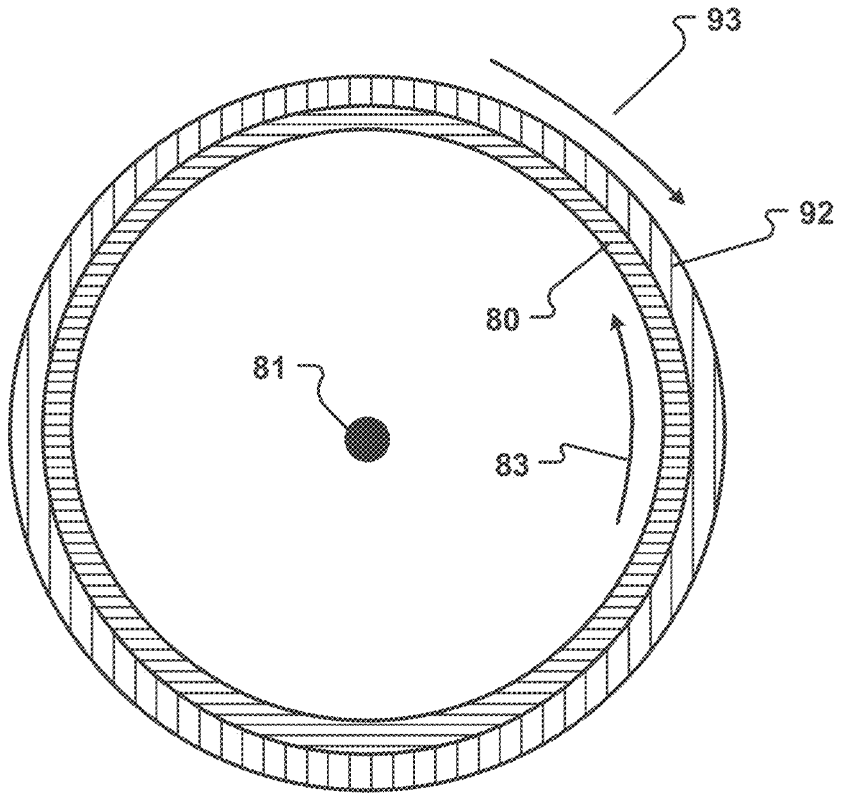
FIG. 7 is a cross-sectional top plan view of the metallic bottle and the ROPP closure taken along line 7-7 of FIG. 5 and further illustrating rotation of one or more of the metallic bottle and the ROPP closure in a closing direction during the sealing of the metallic bottle.

Alternatively, and referring now to FIG. 7, to decrease the axial travel of the ROPP closure 92 during spring back, one or more of the metallic bottle 80 and the ROPP closure 92 may be rotated in a closing direction 83, 93, respectively, to drive the bottle curl 86 into the ROPP liner 100. Rotating either the metallic bottle 80 or the ROPP closure in the closing direction 83, 93 during the sealing of the metallic bottle 80 generally improves the seal between the closure liner 100 and the bottle curl 86.

Accordingly, in one embodiment of the present invention, the capping apparatus 68 is operable to rotate the ROPP closure 92 axially in the closing direction 93. In one embodiment at least one of the pressure block ejector 70 and the pressure block 72 rotate axially in the closing direction 93 before the topload is released. The axial rotation of the pressure block ejector 70 and/or the pressure block 72 cause the ROPP closure 92 to rotate axially in the closing direction 93. It will be appreciated by one of skill in the art that the closing direction 93 of the ROPP closure 92 is the opposite of the opening direction which is used to rotate the ROPP closure 92 off of the metallic bottle 80. The closing rotation of the ROPP closure 92 drives the closure threads 98 further onto the bottle threads 88. Rotating the ROPP closure 92 in the closing direction 93 also decreases a distance between a closed bottom portion of the metallic bottle 80 and the top portion 104 of the ROPP closure 92. In this manner, the ROPP liner 100 is compressed further onto the curl 86 without increasing the topload applied by one or more of the pressure block ejector 70 and the pressure block 72. Thus, the length of region of vertical contact 112 of the ROPP liner 100 and the bottle curl 86 can be increased without increasing the topload applied to the metallic bottle 80 and the ROPP closure 92. Additionally, the axial travel of the ROPP closure 92 due to spring back when the topload is released is limited to less than the length of the vertical contact region 112. Accordingly, the metallic bottle 80 may be sealed with a ROPP closure 92 having a channel 102 that has a decreased depth 114 (and is formed with a decreased topload) compared to the channel 32 formed by the prior art capping apparatus 22. Rotating the ROPP closure 92 in the closing direction 93 during sealing of a metallic bottle 80 may also control the amount of torque required to remove the ROPP closure 92 by a consumer. Accordingly, the amount of torque required to remove the ROPP closure 92 may be reduced by rotating the ROPP closure 92 in the closing direction 93 during the sealing of the metallic bottle 80. More specifically, by rotating the ROPP closure 92 in direction 93 during the sealing, the amount of torque subsequently required to remove the ROPP closure 92 is reduced compared to the amount of torque required to remove a similar ROPP closure that was not rotated during the sealing of a similar metallic bottle.

In one embodiment, the ROPP closure 92 is rotated in the closing direction 93 by the capping apparatus 68 before the pilfer roller 78 tucks the pilfer band 94. In another embodiment, the capping apparatus 68 rotates the ROPP closure 92 in the closing direction 93 when the closure threads 98 have been at least partially formed by the thread roller 76. For example, the ROPP closure 92 may be rotated in direction 93 after at least one pass of the thread rollers 76 when multiple passes are used to form the closure threads 98. Optionally, the capping apparatus 68 may rotate the ROPP closure 92 in the closing direction 93 after each pass of the thread rollers 76. In a more preferred embodiment, the ROPP closure 92 may be rotated in direction 93 only after the closure threads 98 have been completely formed. Additionally, in embodiments, the topload applied to the ROPP closure 92 by the pressure block ejector 70 and/or the pressure block 72 may be decreased after the capping apparatus 68 rotates the ROPP closure 92 in the closing direction 93. Optionally, the topload applied by one or more of the pressure block ejector 70 and the pressure block 72 may be completely eliminated (reduced to zero pounds) after the ROPP closure 92 is rotated at least one time in the closing direction 93 by the capping apparatus 68.

It will be appreciated by one of skill in the art that the curl 86 may be driven further into the liner 100 by rotating either the ROPP closure 92 or the metallic bottle 80. Accordingly, in one embodiment, the metallic bottle 80 is rotated axially in the closing direction 83 instead of, or in addition to, each rotation of the ROPP closure 92 in the closing direction 93 described herein. For example, in one embodiment the capping apparatus 68 further comprises a tool to hold the metallic bottle 80 during sealing by the capping apparatus 68. The tool may be one or more of a chuck 64 and a holder 66. The chuck 64 may engage the closed end portion 87 of the metallic bottle 80. The holder 66 may include an aperture which receives the body portion 85 of the metallic bottle 80. In one embodiment, one or more of the chuck 64 and the holder 66 are configured to rotate the metallic bottle 80 axially in the closing direction 83 further into the ROPP closure 92 at one or more predetermined times during the sealing of the metallic bottle 80.

Each rotation of the ROPP closure 92 and/or the metallic bottle 80 may be less than a complete revolution around the longitudinal axis 81. Accordingly, in one embodiment, one or more of the metallic bottle 80 and the ROPP closure 92 are rotated at least a portion of one revolution around the longitudinal axis 81 in the closing direction 83, 93, respectively.

Figure 8:
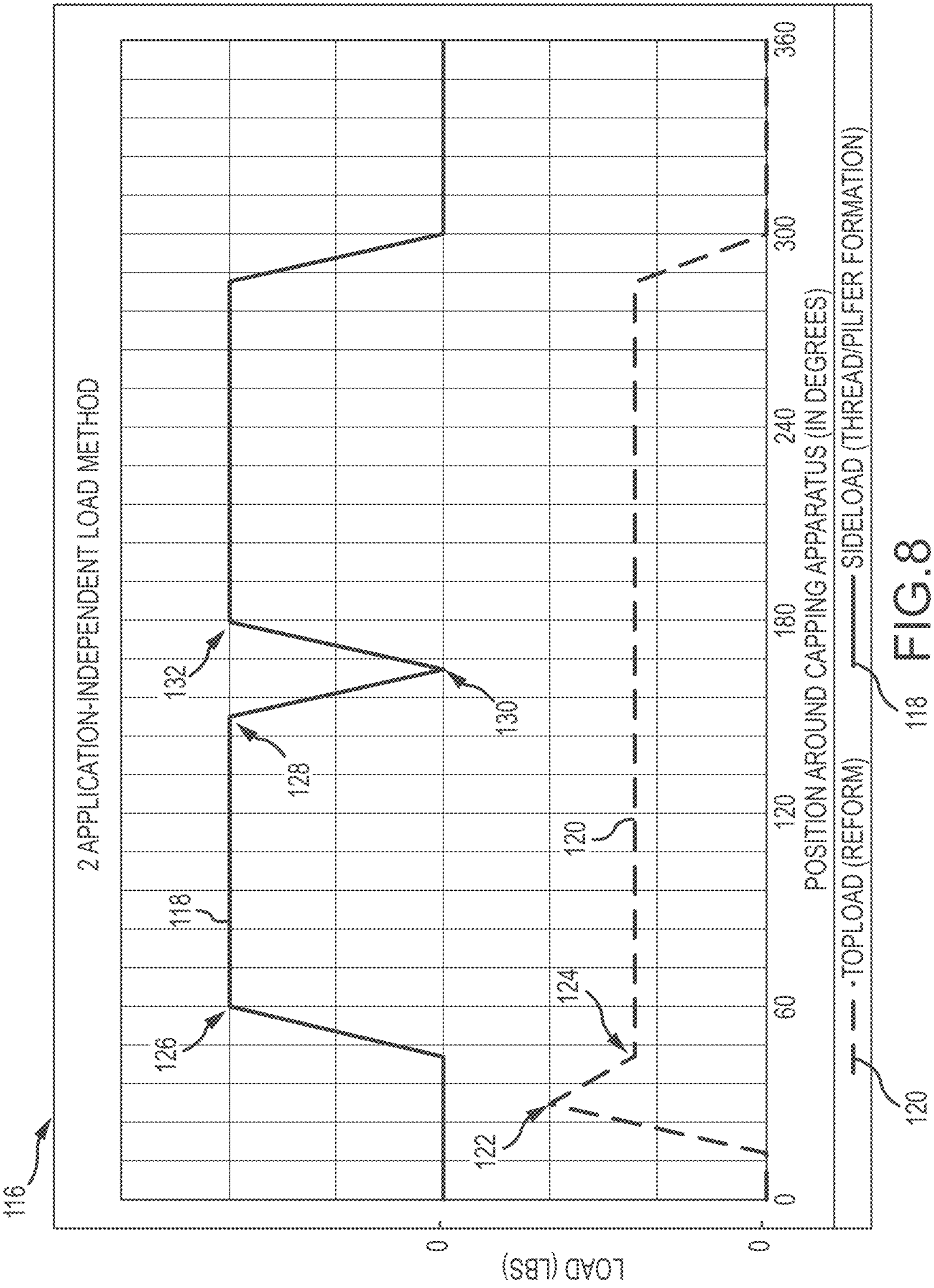
FIG. 8 is a graph of sideload and topload forces applied to a metallic bottle during sealing with a ROPP closure by a capping apparatus of an embodiment of the present invention.

Referring now to FIG. 8, a graph 116 of sideload 118 and topload 120 forces applied to a metallic bottle 80 by a capping apparatus 68 of an embodiment of the present invention to seal the metallic bottle 80 with a ROPP closure 92 are illustrated. In one embodiment, the topload 120 initially increases from zero pounds to a maximum amount at point 122 during formation of the closure channel 102 by the pressure block 72. After the closure channel 102 has been formed, the topload 120 applied by at least one of the pressure block ejector 70 and the pressure block 72 is reduced to point 124. The topload 120 applied at point 124 is sufficient to maintain the seal between the bottle curl 86 and the ROPP liner 100. Optionally, when at least one of the ROPP closure 92 and the metallic bottle 80 are rotated during the sealing to drive the bottle curl 86 further into the ROPP liner 100, the maximum topload 120 may be reduced and is less than the topload of point 122, for example, when the pressure block 72 forms a closure channel 102 with a reduced depth 114. Accordingly, in one embodiment of the present invention, by forming a channel 102 with a reduced depth compared to the channel 32 formed by the prior art capping apparatus 22 and subsequently rotating one of the metallic bottle 80 and the ROPP closure 92 during the sealing of the metallic bottle 80, the capping apparatus 68 of the present invention applies less topload 120 at point 122 than the prior art capping apparatus 22. In this manner, the capping apparatus 68 of one embodiment of the present invention may be used to cap and seal a light-weight metallic bottle 80 of one embodiment of the present invention. Said another way, a light-weight metallic bottle 80 of the present invention would be expected to fail when sealed by a prior art capping apparatus 22 that forms a channel 32 in the ROPP closure 10.

Once the seal between the bottle curl 86 and the ROPP liner 100 has been created, at least one thread roller 76 and at least one pilfer roller 78 apply a sideload 118 at point 126. Thus, in one embodiment, the beginning of the formation of the closure threads 98 and tuck of the pilfer band 94 are purposely delayed until the topload 120 is reduced at point 124 to maintain the seal. The cumulative load comprising the topload 120 and sideload 118 at point 126 is less than the cumulative load applied by the prior art capping apparatus 22.

As previously described, in one embodiment of the present invention, the at least one thread roller 76 and the at least one pilfer roller 78 apply sideloads separately to form the closure threads 98 and tuck the pilfer band 94. Accordingly, in one embodiment, only one of the at least one thread roller 76 and the at least one pilfer roller 78 contact the ROPP closure 92 and apply a sideload to the metallic bottle 80 at any given time. The order of contact with the ROPP closure 92 by the thread roller 76 and the pilfer roller 78 may vary. For example, in one embodiment, the pilfer roller 78 contacts the ROPP closure 92 before the thread roller 76. Alternatively, the pilfer roller 78 contacts the ROPP closure 92 after the thread roller 76.

The at least one thread roller 76 and the at least one pilfer roller 78 may perform their operations in multiple alternating or sequential passes. An example of a change in the sideload 118 between passes of the thread roller 76 and the pilfer roller 78 is illustrated by points 128, 130, 132. At point 128, at least one of the thread roller 76 and pilfer roller 78 begin to reset. A reset of the thread roller 76 comprises movement of the thread roller 76 to an initial position proximate to the closure channel 102. For example, the at least one thread roller 76 may move from a position proximate to the pilfer band 94 back to a point proximate to the closure channel 102. During the movement, the sideload applied by the at least one thread roller 76 and/or the at least one pilfer roller 78 decreases from point 128 to zero pounds at point 130 as the thread roller 76 and pilfer roller 78 move out of contact with the ROPP closure 92. When the thread roller 76 is positioned proximate to the closure channel 102, the thread roller 76 moves into contact with the ROPP closure 92 and begins applying force until the sideload 118 reaches the maximum at point 132. During the reset of the at least one thread roller 76 and the at least one pilfer roller 78, the topload 120 is maintained at a substantially constant amount required to maintain the seal achieved at point 124. Although only one reset of the thread roller 76 and the pilfer roller 78 is illustrated in graph 116, it will be appreciated by one of skill in the art that any number of roller resets associated with passes of the thread roller 76 and the pilfer roller 78 may be used with the capping apparatus 68. For example, in one embodiment, the at least one thread roller 76 performs from one to five passes to form the closure threads 98. Similarly, in another embodiment, the at least one pilfer roller 78 performs from one to five passes to tuck the pilfer band 94 against the bottle skirt 82.

Table 3 illustrates topload and sideload forces generated by a capping apparatus 68 of an embodiment of the present invention to seal a metallic bottle 80 with a ROPP closure 92.

TABLE 3

INDEPENDENT SIDELOAD/TOPLOAD METHOD

| Operation | Topload (lbs) | Cumulative Sideload (lbs) | Cumulative Load (lbs) |
|---|---|---|---|
| Reform (Optional) | <300 | 0 | <300 |
| Maintain Seal | <200 | 0 | <200 |
| Thread/Pilfer Form | <200 | <120 | <320 |
| Thread/Pilfer Roller Reset | <200 | 0 | <200 |
| Thread/Pilfer Form | <200 | <120 | <320 |
| Package Discharge | | 0 | 0 |

In one embodiment, the metallic bottle 80 is a light-weight metallic bottle of an embodiment of the present invention. Although only one "thread/pilfer roller reset" is shown in Table 3, row 5, as previously described the capping apparatus 68 may reset one or more of the thread roller 76 and the pilfer roller 78 any number of times.

All values listed in Table 3 are approximate values. Accordingly, in one embodiment, the topload in column 2 may vary by about +/−5%. Alternatively, in another embodiment, the topload may vary by about +/−10 pounds. In one embodiment, the topload required to form the channel 102 in the ROPP closure 92 is no more than about 300 pounds. In another embodiment, the topload required to maintain seal between the ROPP liner 100 and the bottle curl 86 is no greater than about 200 pounds. In one embodiment, the sideload may vary by about +/−5%. In another embodiment, the sideload may vary by about +/−1 pound on each individual roller 76, 78. In another embodiment, the cumulative sideload is less than about 120 pounds. In still another embodiment, the cumulative sideload is less than about 110 pounds.

Figure 4:
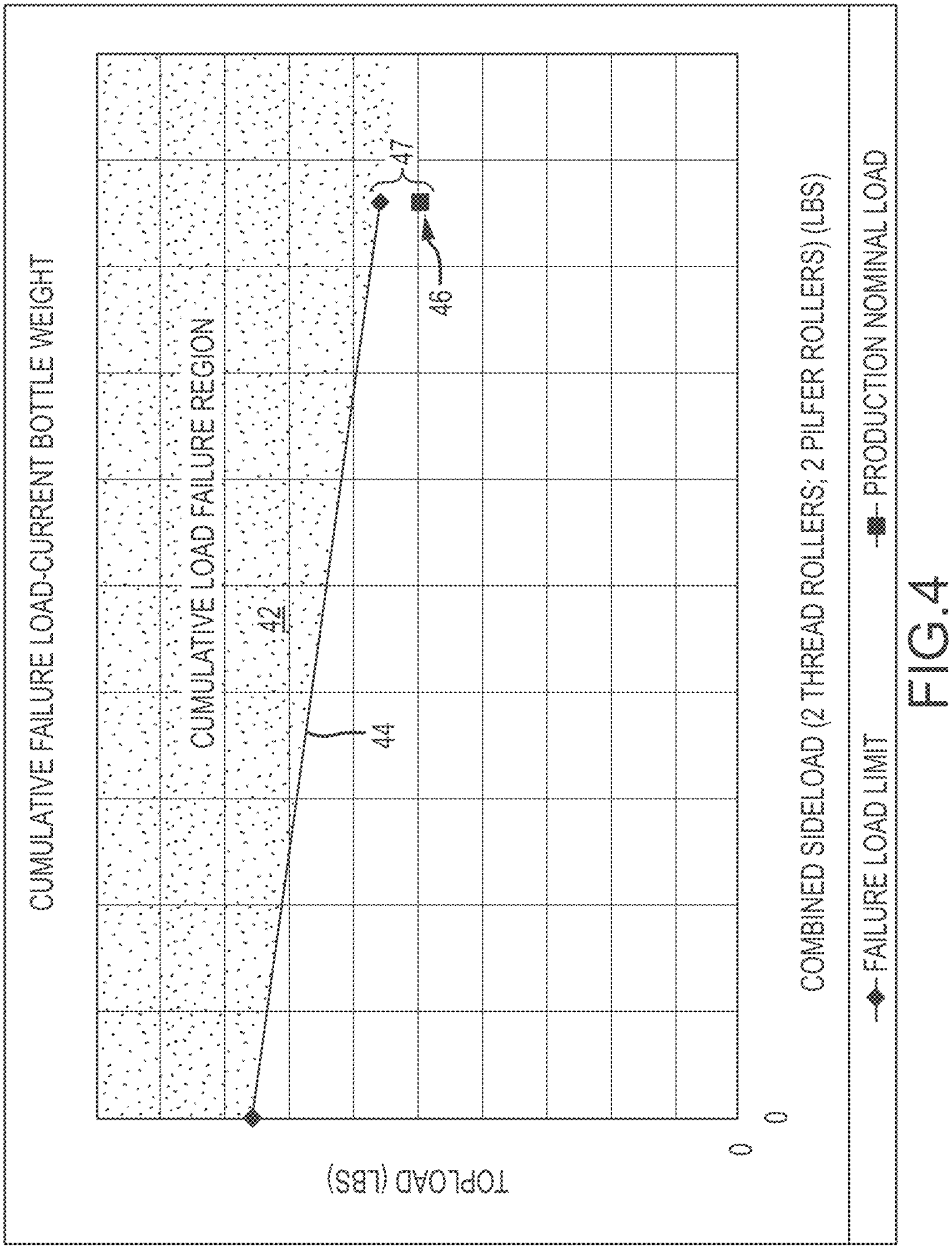
FIG.4 (PRIOR ART)
FIG. 4 is a graph of the cumulative forces applied by a prior art capping apparatus to a metallic bottle during a capping process and illustrating a failure region in which the cumulative forces may be expected to cause failure of the metallic bottle or loss of seal between a ROPP closure and the metallic bottle.
Figure 9:
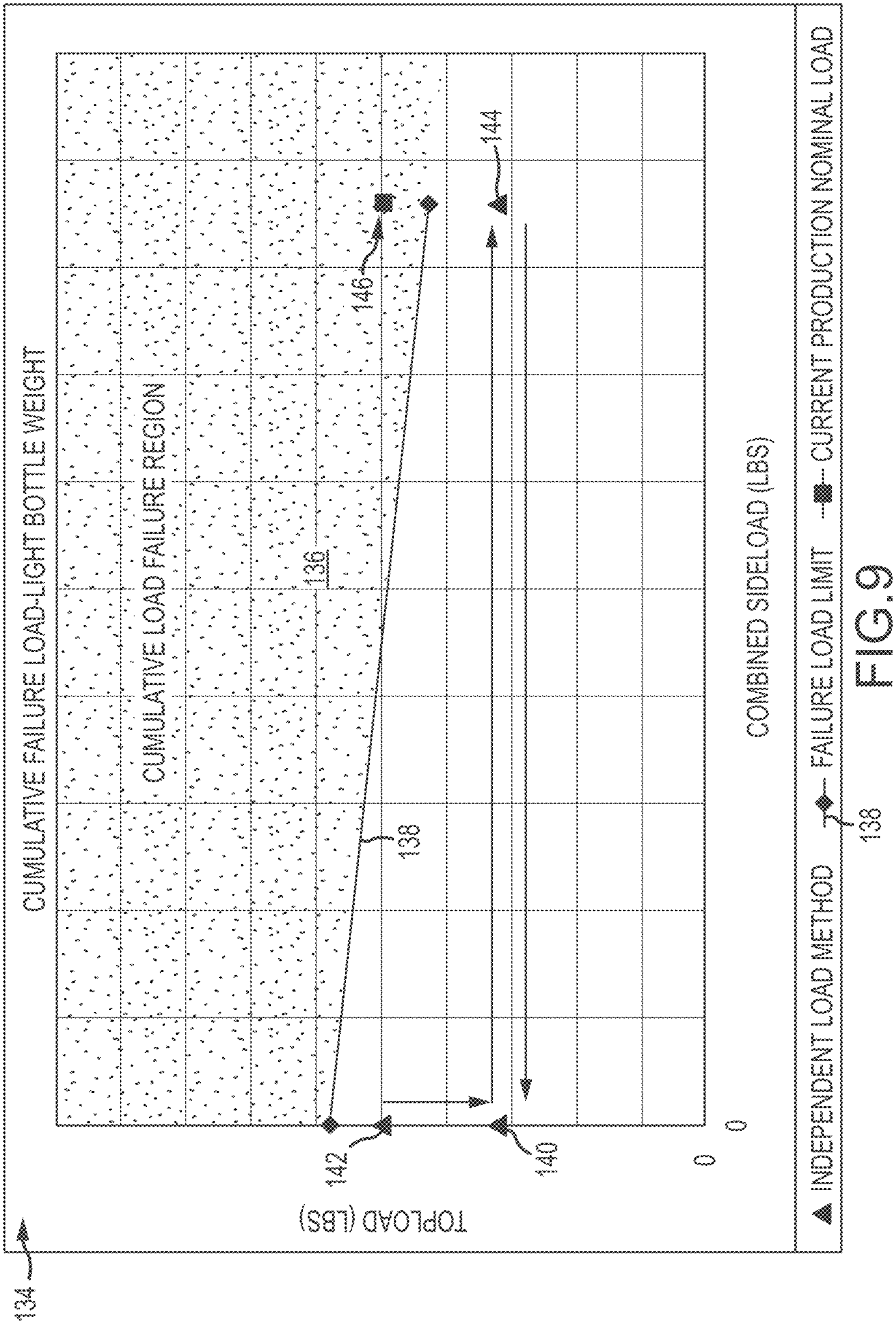
FIG. 9 is a graph of the cumulative forces applied by a capping apparatus of the present invention to a light-weight metallic bottle during a capping process and illustrating a failure region in which the cumulative forces may be expected to cause failure of the light-weight metallic bottle.

Referring now to FIG. 9, a graph 134 of production capping loads generated by the methods and capping apparatus 68 of embodiments of the present invention are plotted. Sideload forces generated by at least one thread roller 76 and/or at least one pilfer roller 78 of the capping apparatus 68 are plotted on the X-axis in pounds. Topload forces generated by at least one of the pressure block ejector 70 and the pressure block 72 are plotted on the Y-axis in pounds. The graph 134 includes a cumulative load failure region 136 above a failure threshold line 138 based on an expected failure limit for a light-weight metallic bottle 80 of the present invention. Note that the failure threshold line 138 has been moved closer to the X-axis compared to the failure threshold line 44 illustrated in FIG. 4 for prior art capping apparatus 22.

Notably, all operations performed by capping apparatus 68 fall below the failure threshold line 138 and outside failure region 136. More specifically, at point 140, the pressure block ejector 70 applies a topload to the ROPP closure 92 to generate and maintain a seal between the bottle curl 86 and the ROPP liner 100. In one embodiment, the topload at point 140 is less than about 200 pounds. Optionally, the pressure block 72 applies a topload to a portion of the top portion 104 to create the channel 102 of a predetermined depth 114 at point 142. In one embodiment, the topload at point 142 is no more than about 300 pounds.

Optionally, the depth 114 of the closure channel 102 is less than the depth of the channel 32 of ROPP closure 10 formed by the prior art capping apparatus 22. In one embodiment of the present invention, the closure channel 102 formed by the capping apparatus 68 has a depth 114 of less than approximately 0.1 inches. The depth 114 of the channel is optionally less than about 0.075 inches. In a more preferred embodiment, the depth 114 is less than approximately 0.05 inches. In another embodiment, the depth 114 is no more than about 80% of the distance from an exterior surface of the closure top portion 104 to a bottom portion of the bottle curl 86. In a more preferred embodiment, the depth 114 is less than about 75% of the distance from the exterior surface to the bottom of the bottle curl 86. In still another embodiment, the depth 114 is less than about two times the length of the region 112 of vertical contact between the ROPP liner 100 and the curl 86. Accordingly, as a channel 102 with less depth 114 can be formed with less topload force, the topload force applied at point 142 by the capping apparatus 68 of the present invention is less than the topload force applied by the prior art capping apparatus 22 to form the channel 32. After the optional force associated with formation of the channel 102 is complete, the topload force applied to the ROPP closure 92 is reduced and returns to point 140.

The thread rollers 76 and pilfer rollers 78 next apply sideloads illustrated at point 144. In one embodiment, the cumulative sideload force at point 144 is less than about 120 pounds. In one embodiment, the sideload force at point 144 is a maximum sideload generated by substantially simultaneous contact of at least one thread roller 76 and at least one pilfer roller 78. In another embodiment, the sideload force at point 144 represents the substantially simultaneous contact of two thread rollers 76 and two pilfer rollers 78 with the ROPP closure 92. Accordingly, by independently applying the topload generated by the pressure block 72 and subsequently applying the sideload by the thread and pilfer rollers 76, 78, a light-weight metallic bottle 80 of the present invention may be sealed without reducing any of the individual loads generated the capping apparatus 68 compared to the prior art capping apparatus 22.

In another embodiment in which the number of passes of the thread rollers 76 and the pilfer rollers 78 is increased, the maximum sideload force is less than the sideload force at point 144. Additionally, in an optional embodiment, the thread rollers 76 and the pilfer rollers 78 contact and apply sideloads to the ROPP closure 92 at different times. Accordingly, the sideload force is less than the sideload force of point 144 when the thread rollers 76 and the pilfer rollers 78 perform their actions consecutively (or independently) as described above.

Point 146 represents the cumulative load produced by the prior art capping apparatus 22. As point 146 is within the failure region 136, a light-weight metallic bottle 80 of the present invention sealed by capping apparatus 22 would be expected to fail.

Figure 10:
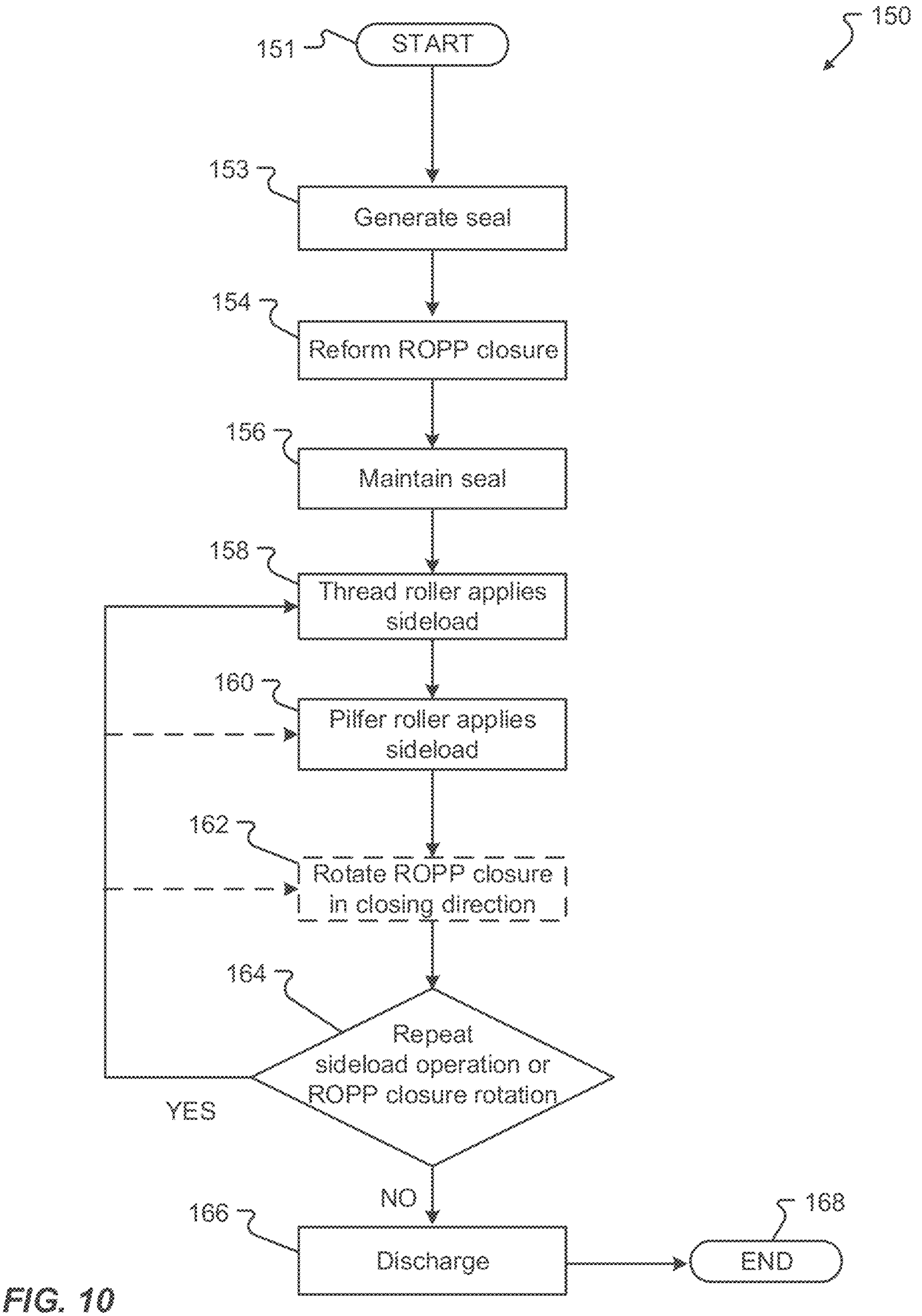
FIG. 10 is a flow chart of one embodiment of a method of sealing a metallic bottle with a ROPP closure.

Referring now to FIG. 10, an embodiment of a method 150 of sealing a metallic bottle 80 with a ROPP closure 92 using a capping apparatus 68 of the present invention is generally illustrated. The method 150 generally starts with a start operation 151 and ends with an end operation 168. While a general order of operations of the method 150 is shown in FIG. 10, the method 150 can include more or fewer operations or can arrange the order of the operations differently than those shown in FIG. 10. Additionally, although the operations of method 150 may be described sequentially, many of the operations may in fact be performed in parallel or concurrently. In one embodiment, the method 150 is executed mechanically by the capping apparatus 68. The method 150 can optionally be executed as a set of computer-executable instructions executed by a computer system and encoded or stored on a computer readable medium. The computer system may be operable to control the capping apparatus 68.

Hereinafter, the method 150 shall be explained with reference to the apparatus, components, metallic containers, and ROPP closures described in conjunction with FIGS. 1-9.

In operation 153, the capping apparatus 68 receives a metallic bottle 80 and a ROPP shell 9. One or more of the pressure block ejector 70 and the pressure block 72 apply a predetermined sealing topload to at least a portion of the top portion 104 of the ROPP closure 92 to seal the ROPP liner 100 against the curl 86 of the metallic bottle 80. In one embodiment, the metallic bottle 80 is the same as, or similar to, the prior art metallic bottle 2. In another embodiment, the metallic bottle 80 is a light-weight metallic bottle of the present invention.

In operation 154, the capping apparatus 68 creates a channel 102 in the ROPP closure 92. More specifically, the pressure block 72 applies a predetermined reform topload to a radially outer portion of the closure top portion 104. The channel 102 may have a predetermined depth 114 and any desired cross-sectional profile. Accordingly, in one embodiment, the pressure block 72 may apply a decreased predetermined topload to form a channel 102 with a decreased depth 114 compared to channel 32 formed by prior art capping apparatus 22. For example, in one embodiment in which one or more of the ROPP closure 92 and the metallic bottle 80 are rotated in respective closing directions 93, 83 during the sealing to force the curl 86 further into the ROPP liner 100 as described herein, a channel 102 with a decreased depth 114 may be formed by the capping apparatus 68. In this manner, less topload is applied to the ROPP closure 92 by capping apparatus 68 compared to the topload applied to ROPP closure 10 by capping apparatus 22.

In operation 156, at least one of the pressure block ejector 70 and the pressure block 72 continue to apply the predetermined sealing topload to maintain the seal of the ROPP liner 100 against the curl 86 of the metallic bottle 80. The predetermined sealing topload applied in operation 156 is less than the reform topload applied in all embodiments of operation 154.

At least one thread roller 76 may contact and apply a sideload to the ROPP closure 92 in operation 158. Optionally, the at least one thread roller 76 comprises from one to five thread rollers 76. In one embodiment, the thread roller 76 applies a sideload approximately equal to the sideload applied by the thread rollers 26 of the prior art capping apparatus 22. Alternatively, in an embodiment, at least one of the thread rollers 76 applies less of a sideload than the thread rollers 26 of capping apparatus 22. In still another embodiment, the at least one thread roller 76 forms the closure threads 98 in from one to five passes. In one embodiment, the at least one thread roller 76 may apply a sideload force that is different in at least one of the one to five passes compared to sideload forces applied by the at least one thread roller 76 in other passes. In one embodiment, the closure threads 98 are completely formed by the at least one thread roller 76 before method 150 proceeds to operation 160. Accordingly, in one embodiment of the present invention, operations 158 and 160 are performed at different times. Alternatively, the closure threads 98 are only partially formed when method 150 proceeds to operation 160. In another embodiment, operations 158 and 160 are performed substantially simultaneously.

In operation 160, at least one pilfer roller 78 may contact and apply a sideload to the pilfer band 94 to tuck the pilfer band 94 against the bottle skirt 82. Optionally, the at least one pilfer roller 78 comprises from one to five pilfer rollers 78. In one embodiment, the pilfer roller 78 applies a sideload approximately equal to the sideload applied by the pilfer rollers 28 of the prior art capping apparatus 22. Alternatively, in an embodiment, at least one of the pilfer rollers 78 applies a decreased sideload compared to the pilfer rollers 28 of capping apparatus 22. In still another embodiment, the at least one pilfer roller 78 performs its operation in from one to five passes. In one embodiment, the at least one pilfer roller 78 may apply a sideload force that is different in at least one of the one to five passes.

Optionally, in operation 162, the capping apparatus 68 rotates the ROPP closure 92 in the closing direction 93 further down onto the bottle threads 88. More specifically, at least one of the pressure block ejector 70 and the pressure block 72 rotate axially in a closing direction. The axial rotation of the pressure block ejector 70 and/or the pressure block 72 cause the ROPP closure 92 to rotate in the closing direction 93. In another embodiment, a rotating tool of the capping apparatus 68 is used to rotate the ROPP closure 92 in the closing direction 93. Alternatively, the metallic bottle 80 may be rotated axially in the closing direction 83 instead of, or in addition to, the axial rotation of the ROPP closure 92 in operation 162.

Operation 162 may optionally be performed before the closure threads 98 are completely formed. Alternatively, operation 162 may be performed after the formation of the closure threads 98 is completed. Additionally, in one embodiment, one or more of the ROPP closure 92 and the metallic bottle 80 are rotated in the closing direction 93, 83 at least partially in operation 162 before the pilfer roller 78 completes the tucking of the pilfer band 94 against the bottle skirt 82.

In operation 164, method 150 determines whether one or more of operations 158, 160, and 162 should be repeated. Accordingly, method 150 may return YES to any of operations 158, 160, and 162 any number of times until formation of the ROPP closure 92 and sealing of the metallic bottle 80 are complete. When operations 158, 160, and 162 have been performed a predetermined number of times, method 150 proceeds NO to operation 166.

The metallic bottle 80 is discharged from the capping apparatus 68 in operation 166. Capping apparatus 68 may then reset to an initial state to receive another metallic bottle 80 for sealing. The method 150 then ends 168.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A method of sealing an open end of a threaded metallic bottle with a closure, comprising:

providing a capping apparatus having a pressure block, a pressure block ejector, and a thread roller;

positioning the closure on a threaded neck of the threaded metallic bottle;

applying a first topload by the pressure block ejector to an exterior surface of a top portion of the closure to seal the threaded metallic bottle;

while the first topload is applied to the closure, forming threads on the closure with the thread roller;

before forming the threads on the closure, applying a second topload to a portion of the closure to form a channel in an outer radial edge of the closure, wherein the second topload is greater than the first topload and is applied by the pressure block of the capping apparatus, and wherein the pressure block is configured to apply and release the second topload to the top portion of the closure before the thread roller applies a first sideload to form the threads; and after forming the threads on the closure, rotating at least one of the closure and the threaded metallic bottle around a longitudinal axis of the threaded metallic bottle such that an uppermost portion of the open end of the threaded metallic bottle is moved closer to the exterior surface of the top portion of the closure.

2. The method of claim 1, further comprising, after rotating at least one of the closure and the threaded metallic bottle, tucking a pilfer band of the closure proximate to a skirt portion of the threaded metallic bottle with a pilfer roller of the capping apparatus.

3. The method of claim 1, further comprising, before rotating at least one of the closure and the threaded metallic bottle, tucking a pilfer band of the closure proximate to a skirt portion of the threaded metallic bottle with a pilfer roller of the capping apparatus.

4. The method of claim 1, wherein the channel is formed after the closure is positioned on the threaded neck.

5. The method of claim 1, wherein the channel has a depth of less than approximately 0.1 inches.

6. The method of claim 5, wherein the depth of the channel is less than approximately 0.05 inches.

7. The method of claim 1, wherein the rotating occurs after a first pass of the thread roller and before a second pass of the thread roller when the threads are partially formed.

8. The method of claim 1, wherein the rotating occurs only after a final pass of the thread roller after the threads are completely formed.

9. The method of claim 1, wherein the rotating comprises rotating the threaded metallic bottle axially.

10. The method of claim 9, wherein the rotating further comprises rotating the closure axially.

11. The method of claim 9, wherein during the rotating, the capping apparatus retains the closure in a stationary position while the threaded metallic bottle is rotated axially.

12. A method of sealing an open end of a threaded metallic bottle with a closure, comprising:

providing a capping apparatus having a pressure block ejector and a thread roller;

positioning the closure on a threaded neck of the threaded metallic bottle;

applying a first topload by the pressure block ejector to an exterior surface of a top portion of the closure to seal the threaded metallic bottle;

while the first topload is applied to the closure, forming threads on the closure with the thread roller by at least a first pass and a second pass of the thread roller; and after at least partially forming the threads on the closure, rotating at least one of the closure and the threaded metallic bottle around a longitudinal axis of the threaded metallic bottle such that an uppermost portion of the open end of the threaded metallic bottle is moved closer to the exterior surface of the top portion of the closure, wherein the rotating occurs after the first pass of the thread roller and before the second pass of the thread roller when the threads are partially formed.

13. The method of claim 12, further comprising, before forming the threads on the closure, applying a second topload to a portion of the closure to form a channel in an outer radial edge of the closure, wherein the second topload is greater than the first topload and is applied by a pressure block of the capping apparatus, and wherein the pressure block is configured to apply and release the second topload to the top portion of the closure before the thread roller applies a first sideload to form the threads.

14. The method of claim 12, wherein the closure comprises a channel formed in an outer radial edge of the closure, and wherein the channel has a depth of less than approximately 0.1 inches.

15. The method of claim 14, wherein the depth of the channel is less than approximately 0.05 inches.

16. The method of claim 12, wherein the closure comprises a channel formed in an outer radial edge of the closure.

17. A method of sealing an open end of a threaded metallic bottle with a closure, comprising:

providing a capping apparatus having a pressure block, a pressure block ejector, and a thread roller;

positioning the closure on a threaded neck of the threaded metallic bottle;

applying a first topload by the pressure block ejector to an exterior surface of a top portion of the closure to seal the threaded metallic bottle;

applying a second topload by the pressure block to a portion of the closure to form a channel in an outer radial edge of the closure, wherein the second topload is greater than the first topload, and wherein the channel has a depth of less than approximately 0.1 inches;

while the first topload is applied to the closure, forming threads on the closure with the thread roller that applies a first sideload, wherein the channel is formed before the threads are formed on the closure, and wherein the pressure block is configured to apply and release the second topload to the top portion of the closure before the thread roller applies the first sideload to form the threads on the closure; and after forming the threads on the closure, rotating at least one of the closure and the threaded metallic bottle around a longitudinal axis of the threaded metallic bottle such that a distance between an uppermost portion of the open end of the threaded metallic bottle and the exterior surface of the top portion of the closure is decreased.

18. The method of claim 17, wherein the threads are formed on the closure during at least a first pass and a second pass of the thread roller, and wherein the rotating occurs after the first pass of the thread roller and before the second pass of the thread roller when the threads are partially formed.

19. The method of claim 17, wherein the depth of the channel is less than approximately 0.05 inches.

* * * * *